US012707494B2

(12) United States Patent

Lei et al.

(10) Patent No.: US 12,707,494 B2
(45) Date of Patent: Aug. 11, 2026

(54) REUSING WAVEFORM TYPES FOR CONTENTION-FREE RANDOM ACCESS PROCEDURES

(71) Applicant: QUALCOMM Incorporated, San Diego, CA (US)

(72) Inventors: Jing Lei, San Diego, CA (US); Kianoush Hosseini, San Diego, CA (US); Kazuki Takeda, Minato-ku (JP)

(73) Assignee: QUALCOMM Incorproated, San Diego, CA (US)

( * ) Notice: Subject to any disclaimer, the term of this patent is extended or adjusted under 35 U.S.C. 154(b) by 289 days.

(21) Appl. No.: 18/470,372

(22) Filed: Sep. 19, 2023

(65) Prior Publication Data

US 2025/0097975 A1 Mar. 20, 2025

(51) Int. Cl.
*H04W 74/04* (2009.01)

(52) U.S. Cl.
CPC .................................. *H04W 74/04* (2013.01)

(58) Field of Classification Search
CPC .......................... H04W 74/04; H04W 74/0838
See application file for complete search history.

(56) References Cited

U.S. PATENT DOCUMENTS 11,284,420 B2 * 3/2022 Lin .................. H04W 74/0833
11,445,549 B2 * 9/2022 Yerramalli ............ H04W 52/34
12,232,175 B2 * 2/2025 Takahashi ............. H04W 72/21
2020/0053793 A1 * 2/2020 Loehr ............... H04W 74/0808
2020/0351947 A1 * 11/2020 Lei ........................ H04L 5/0051
2021/0112600 A1 * 4/2021 Lei ........................ H04L 5/0091
2021/0204326 A1 * 7/2021 Zhang .................... H04W 76/11
2021/0392692 A1 * 12/2021 Sakhnini ............. H04W 74/006
2022/0124813 A1 * 4/2022 Cao ........................ H04L 5/0048
2022/0132584 A1 * 4/2022 He .................... H04W 74/0833
2022/0240306 A1 * 7/2022 Landis ................ H04W 74/002
2022/0377814 A1 * 11/2022 Jeon .................. H04W 74/0841
2022/0394781 A1 * 12/2022 Lu ...................... H04W 74/0866
2024/0188074 A1 * 6/2024 Löhr ................. H04W 72/1268
2025/0089099 A1 * 3/2025 Zhang ................. H04W 74/006

FOREIGN PATENT DOCUMENTS

EP 3888406 B1 * 11/2024 ........ H04W 74/0833
WO WO-2015190959 A1 * 12/2015 ............ H04W 74/04

* cited by examiner

*Primary Examiner* — Nizar N Sivji
(74) *Attorney, Agent, or Firm* — Holland & Hart LLP

(57) ABSTRACT

Methods, systems, and devices for wireless communications are described. The described techniques may enable a user equipment (UE) to reuse a same waveform type for both of a first contention-free random access (CFRA) message and an acknowledgement (ACK) message for a random access response (RAR) message from a network entity. The UE may transmit the first CFRA message using a first waveform type and via a first resource with a first resource index, and may retransmit the first waveform type via a second resource with the first resource index in response to receiving the RAR message. In some examples, the UE may not receive the RAR message. In such examples, the UE may not retransmit the waveform. That is, if the network entity does not receive the response to the RAR message, the network entity may interpret the lack of response as a negative acknowledgement (NACK).

37 Claims, 20 Drawing Sheets

RAR Message 220

205

210

First RACH Message 215

Second RACH Message 225

105-a 115-a

Frequency 240-a 240-b 240-c

Time 245-a 245-b 245-c

200

REUSING WAVEFORM TYPES FOR CONTENTION-FREE RANDOM ACCESS PROCEDURES

INTRODUCTION

The following relates to wireless communications, including reusing waveform types for contention-free random access (CFRA) procedures.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support reusing waveform types for contention-free random access (CFRA) procedures. For example, the described techniques may enable a user equipment (UE) to reuse a same waveform type for both of a first CFRA message and an acknowledgement (ACK) message for a random access response (RAR) message from a network entity. The UE may transmit the first CFRA message using a first waveform type and via a first resource with a first resource index, and may retransmit the first waveform type via a second resource with the first resource index (e.g., in response to receiving the RAR message). The first resource and the second resource may fall within a first time window, which may be preconfigured to the UE.

In some examples, the UE may not receive the RAR message. That is, the UE may be configured with a second time window (e.g., a RAR window) for monitoring for the RAR message, and may not successfully receive and/or decode the RAR message before expiration of the second time window. In such examples, the UE may not retransmit the waveform in response to receiving the RAR message (e.g., the UE may perform discontinued transmission (DTX)). That is, if the network entity does not receive the response to the RAR message (e.g., before expiration of the first time window), the network entity may interpret the DTX as a NACK.

A method for wireless communication by a first network entity is described. The method may include performing a CFRA procedure, where preforming the CFRA procedure includes, transmitting, to a second network entity, a first uplink message via a first resource associated with a first resource index and via a first waveform type, receiving, from the second network entity and in response to the first uplink message, a RAR message, and transmitting, to the second network entity and in response to the RAR message, a second uplink message via a second resource associated with the first resource index and via the first waveform type.

A first network entity for wireless communication is described. The first network entity may include one or more memories storing processor executable code, and one or more processors coupled with the one or more memories. The one or more processors may individually or collectively operable to execute the code to cause the first network entity to perform a CFRA procedure, where preforming the CFRA procedure includes, transmit, to a second network entity, a first uplink message via a first resource associated with a first resource index and via a first waveform type, receive, from the second network entity and in response to the first uplink message, a RAR message, and transmit, to the second network entity and in response to the RAR message, a second uplink message via a second resource associated with the first resource index and via the first waveform type.

Another first network entity for wireless communication is described. The first network entity may include means for performing a CFRA procedure, where preforming the CFRA procedure includes, means for transmitting, to a second network entity, a first uplink message via a first resource associated with a first resource index and via a first waveform type, means for receiving, from the second network entity and in response to the first uplink message, a RAR message, and means for transmitting, to the second network entity and in response to the RAR message, a second uplink message via a second resource associated with the first resource index and via the first waveform type.

A non-transitory computer-readable medium storing code for wireless communication is described. The code may include instructions executable by a processor to perform a CFRA procedure, where preforming the CFRA procedure includes, transmit, to a second network entity, a first uplink message via a first resource associated with a first resource index and via a first waveform type, receive, from the second network entity and in response to the first uplink message, a RAR message, and transmit, to the second network entity and in response to the RAR message, a second uplink message via a second resource associated with the first resource index and via the first waveform type.

In some examples of the method, first network entities, and non-transitory computer-readable medium described herein, performing the CFRA procedure may include operations, features, means, or instructions for receiving, from the second network entity, control information that includes one or more of an indication of the first waveform type, a first time duration for monitoring a physical downlink control channel (PDCCH) for the RAR message after transmission of the first uplink message, or a second time duration during which resources may be available for uplink transmissions during the CFRA procedure, where the first resource and the second resource may be valid for uplink messages of the CFRA procedure within the second time duration.

In some examples of the method, first network entities, and non-transitory computer-readable medium described herein, the first time duration overlaps with the second time duration and the second time duration extends later in time than the first time duration.

In some examples of the method, first network entities, and non-transitory computer-readable medium described herein, the first resource and the second resource include physical random access channel (PRACH) occasions and the first waveform type includes a CFRA preamble.

In some examples of the method, first network entities, and non-transitory computer-readable medium described herein, the first resource and the second resource include physical uplink control channel (PUCCH) occasions and the first waveform type includes a PUCCH waveform.

In some examples of the method, first network entities, and non-transitory computer-readable medium described herein, a cyclic prefix associated with the PUCCH waveform may be longer than a round trip time (RTT) associated with communication between the first network entity and the second network entity.

In some examples of the method, first network entities, and non-transitory computer-readable medium described herein, performing the CFRA procedure may include operations, features, means, or instructions for receiving, from the second network entity, a control message that includes an indication of the association between the transmit beam and the downlink reference signal beam.

In some examples of the method, first network entities, and non-transitory computer-readable medium described herein, the RAR message includes an indication of a timing advance command (TAC) for application to subsequent uplink communications from the first network entity to the second network entity and transmission of the second uplink message may be based on the TAC.

In some examples of the method, first network entities, and non-transitory computer-readable medium described herein, transmission of the first uplink message may be based on a default TAC and the default TAC may be zero.

In some examples of the method, first network entities, and non-transitory computer-readable medium described herein, the RAR message may be a compact RAR message that may be received via a PDCCH and the compact RAR message does not include resource allocation information associated with one or more physical downlink data channels.

A method for wireless communication by a first network entity is described. The method may include performing a CFRA procedure, where performing the CFRA procedure includes, receiving, from a second network entity, a first uplink message via a first resource associated with a first resource index and via a first waveform type, transmitting, to the second network entity and in response to the first uplink message, a RAR message, and receiving, from the second network entity and in response to the RAR message, a second uplink message via a second resource associated with the first resource index and via the first waveform type.

A first network entity for wireless communication is described. The first network entity may include one or more memories storing processor executable code, and one or more processors coupled with the one or more memories. The one or more processors may individually or collectively operable to execute the code to cause the first network entity to perform a CFRA procedure, where performing the CFRA procedure includes, receive, from a second network entity, a first uplink message via a first resource associated with a first resource index and via a first waveform type, transmit, to the second network entity and in response to the first uplink message, a RAR message, and receive, from the second network entity and in response to the RAR message, a second uplink message via a second resource associated with the first resource index and via the first waveform type.

Another first network entity for wireless communication is described. The first network entity may include means for performing a CFRA procedure, where performing the CFRA procedure includes, means for receiving, from a second network entity, a first uplink message via a first resource associated with a first resource index and via a first waveform type, means for transmitting, to the second network entity and in response to the first uplink message, a RAR message, and means for receiving, from the second network entity and in response to the RAR message, a second uplink message via a second resource associated with the first resource index and via the first waveform type.

A non-transitory computer-readable medium storing code for wireless communication is described. The code may include instructions executable by a processor to perform a CFRA procedure, where performing the CFRA procedure includes, receive, from a second network entity, a first uplink message via a first resource associated with a first resource index and via a first waveform type, transmit, to the second network entity and in response to the first uplink message, a RAR message, and receive, from the second network entity and in response to the RAR message, a second uplink message via a second resource associated with the first resource index and via the first waveform type.

In some examples of the method, first network entities, and non-transitory computer-readable medium described herein, performing the CFRA procedure may include operations, features, means, or instructions for transmitting, to the second network entity, control information that includes one or more of an indication of the first waveform type, a first time duration for monitoring a PDCCH for the RAR message after transmission of the first uplink message, or a second time duration during which resources may be available for uplink transmissions during the CFRA procedure, where the first resource and the second resource may be valid for uplink messages of the CFRA procedure within the second time duration.

In some examples of the method, first network entities, and non-transitory computer-readable medium described herein, the first time duration overlaps with the second time duration and the second time duration extends later in time than the first time duration.

In some examples of the method, first network entities, and non-transitory computer-readable medium described herein, the first resource and the second resource include PUCCH occasions and the first waveform type includes a PUCCH waveform.

In some examples of the method, first network entities, and non-transitory computer-readable medium described herein, a cyclic prefix associated with the PUCCH waveform may be longer than a RTT associated with communication between the first network entity and the second network entity.

In some examples of the method, first network entities, and non-transitory computer-readable medium described herein, performing the CFRA procedure may include operations, features, means, or instructions for transmitting, to the second network entity, a control message that includes an indication of the association between the transmit beam and the downlink reference signal beam.

In some examples of the method, first network entities, and non-transitory computer-readable medium described herein, the RAR message includes an indication of a TAC for application to communications from the second network entity to the first network entity.

In some examples of the method, first network entities, and non-transitory computer-readable medium described herein, the RAR message may be a compact RAR message that may be received via a PDCCH and the compact RAR message does not include resource allocation information associated with one or more physical downlink data channels.

A method for wireless communication by a first network entity is described. The method may include performing a CFRA procedure, where performing CFRA procedure includes, receiving, from a second network entity, configuration information for the CFRA procedure, where the configuration information includes one or more resources available for transmission of a first uplink message and of a second uplink message, where the one or more resources are each associated with a first waveform type, and where the second uplink message is configured to be responsive to a RAR message triggered by the first uplink message, transmitting, to the second network entity, the first uplink message via the one or more resources and via a first waveform that is of the first waveform type associated with the one or more resources, monitoring, responsive to the first uplink message, for the RAR message be, and refraining from transmitting, to the second network entity, the second uplink message based on failure to receive the RAR message.

A first network entity for wireless communication is described. The first network entity may include one or more memories storing processor executable code, and one or more processors coupled with the one or more memories. The one or more processors may individually or collectively operable to execute the code to cause the first network entity to perform a CFRA procedure, where performing CFRA procedure includes, receive, from a second network entity, configuration information for the CFRA procedure, where the configuration information includes one or more resources available for transmission of a first uplink message and of a second uplink message, where the one or more resources are each associated with a first waveform type, and where the second uplink message is configured to be responsive to a RAR message triggered by the first uplink message, transmit, to the second network entity, the first uplink message via the one or more resources and via a first waveform that is of the first waveform type associated with the one or more resources, monitor, responsive to the first uplink message, for the RAR message be, and refrain from transmitting, to the second network entity, the second uplink message based on failure to receive the RAR message.

Another first network entity for wireless communication is described. The first network entity may include means for performing a CFRA procedure, where performing CFRA procedure includes, means for receiving, from a second network entity, configuration information for the CFRA procedure, where the configuration information includes one or more resources available for transmission of a first uplink message and of a second uplink message, where the one or more resources are each associated with a first waveform type, and where the second uplink message is configured to be responsive to a RAR message triggered by the first uplink message, means for transmitting, to the second network entity, the first uplink message via the one or more resources and via a first waveform that is of the first waveform type associated with the one or more resources, means for monitoring, responsive to the first uplink message, for the RAR message be, and means for refraining from transmitting, to the second network entity, the second uplink message based on failure to receive the RAR message.

A non-transitory computer-readable medium storing code for wireless communication is described. The code may include instructions executable by a processor to perform a CFRA procedure, where performing CFRA procedure includes, receive, from a second network entity, configuration information for the CFRA procedure, where the configuration information includes one or more resources available for transmission of a first uplink message and of a second uplink message, where the one or more resources are each associated with a first waveform type, and where the second uplink message is configured to be responsive to a RAR message triggered by the first uplink message, transmit, to the second network entity, the first uplink message via the one or more resources and via a first waveform that is of the first waveform type associated with the one or more resources, monitor, responsive to the first uplink message, for the RAR message be, and refrain from transmitting, to the second network entity, the second uplink message based on failure to receive the RAR message.

In some examples of the method, first network entities, and non-transitory computer-readable medium described herein, non-transmission of the second uplink message may be indicative of the failure of the first network entity to receive the RAR message.

In some examples of the method, first network entities, and non-transitory computer-readable medium described herein, performing the CFRA procedure may include operations, features, means, or instructions for receiving, from the second network entity, control information that includes one or more of an indication of the first waveform type, a first time duration for monitoring a PDCCH for the RAR message after transmission of the first uplink message, or a second time duration during which resources may be available for uplink transmissions during the CFRA procedure, where the first resource and the second resource may be valid for uplink messages of the CFRA procedure within the second time duration.

In some examples of the method, first network entities, and non-transitory computer-readable medium described herein, the first time duration overlaps with the second time duration and the second time duration extends later in time than the first time duration.

In some examples of the method, first network entities, and non-transitory computer-readable medium described herein, the one or more resources include PRACH occasions and the first waveform type includes a CFRA preamble.

In some examples of the method, first network entities, and non-transitory computer-readable medium described herein, the one or more resources include PUCCH occasions and the first waveform type includes a PUCCH waveform.

In some examples of the method, first network entities, and non-transitory computer-readable medium described herein, the RAR message includes an indication of a TAC for application to communications from the first network entity to the second network entity.

In some examples of the method, first network entities, and non-transitory computer-readable medium described herein, the RAR message may be a compact RAR message that may be received via a PDCCH and the compact RAR message does not include resource allocation information associated with one or more physical downlink data channels.

A method for wireless communications by a first network entity is described. The method may include performing a CFRA procedure, where performing the CFRA procedure includes, transmitting, to a second network entity, configuration information for the CFRA procedure, where the configuration information includes one or more resources available for transmission by the second network entity of a first uplink message and of a second uplink message, where the one or more resources are each associated with a first waveform type, and where the second uplink message is configured to be responsive to a RAR message triggered by the first uplink message, receiving, from the second network entity, the first uplink message via the one or more resources and via a first waveform that is of the first waveform type associated with the one or more resources, transmitting, to the second network entity and responsive to the first uplink message, the RAR message, monitoring, responsive to the RAR message, for the second uplink message, and determining that absence of a reception of the second uplink message is indicative of a failure of the second network entity to receive the RAR message.

A first network entity for wireless communications is described. The first network entity may include one or more memories storing processor executable code, and one or more processors coupled with the one or more memories. The one or more processors may individually or collectively operable to execute the code to cause the first network entity to perform a CFRA procedure, where performing the CFRA procedure includes, transmit, to a second network entity, configuration information for the CFRA procedure, where the configuration information includes one or more resources available for transmission by the second network entity of a first uplink message and of a second uplink message, where the one or more resources are each associated with a first waveform type, and where the second uplink message is configured to be responsive to a RAR message triggered by the first uplink message, receive, from the second network entity, the first uplink message via the one or more resources and via a first waveform that is of the first waveform type associated with the one or more resources, transmit, to the second network entity and responsive to the first uplink message, the RAR message, monitor, responsive to the RAR message, for the second uplink message, and determine that absence of a reception of the second uplink message is indicative of a failure of the second network entity to receive the RAR message.

Another first network entity for wireless communications is described. The first network entity may include means for performing a CFRA procedure, where performing the CFRA procedure includes, means for transmitting, to a second network entity, configuration information for the CFRA procedure, where the configuration information includes one or more resources available for transmission by the second network entity of a first uplink message and of a second uplink message, where the one or more resources are each associated with a first waveform type, and where the second uplink message is configured to be responsive to a RAR message triggered by the first uplink message, means for receiving, from the second network entity, the first uplink message via the one or more resources and via a first waveform that is of the first waveform type associated with the one or more resources, means for transmitting, to the second network entity and responsive to the first uplink message, the RAR message, means for monitoring, responsive to the RAR message, for the second uplink message, and means for determining that absence of a reception of the second uplink message is indicative of a failure of the second network entity to receive the RAR message.

A non-transitory computer-readable medium storing code for wireless communications is described. The code may include instructions executable by a processor to perform a CFRA procedure, where performing the CFRA procedure includes, transmit, to a second network entity, configuration information for the CFRA procedure, where the configuration information includes one or more resources available for transmission by the second network entity of a first uplink message and of a second uplink message, where the one or more resources are each associated with a first waveform type, and where the second uplink message is configured to be responsive to a RAR message triggered by the first uplink message, receive, from the second network entity, the first uplink message via the one or more resources and via a first waveform that is of the first waveform type associated with the one or more resources, transmit, to the second network entity and responsive to the first uplink message, the RAR message, monitor, responsive to the RAR message, for the second uplink message, and determine that absence of a reception of the second uplink message is indicative of a failure of the second network entity to receive the RAR message.

In some examples of the method, first network entities, and non-transitory computer-readable medium described herein, performing the CFRA procedure may include operations, features, means, or instructions for transmitting, to the second network entity, control information that includes one or more of an indication of the first waveform type, a first time duration for monitoring a PDCCH for the RAR message after transmission of the first uplink message, or a second time duration during which resources may be available for uplink transmissions during the CFRA procedure, where the first resource and the second resource may be valid for uplink messages of the CFRA procedure within the second time duration.

In some examples of the method, first network entities, and non-transitory computer-readable medium described herein, the first time duration overlaps with the second time duration and the second time duration extends later in time than the first time duration.

In some examples of the method, first network entities, and non-transitory computer-readable medium described herein, the one or more resources include PRACH occasions and the first waveform type includes a CFRA preamble.

In some examples of the method, first network entities, and non-transitory computer-readable medium described herein, the one or more resources include PUCCH occasions and the first waveform type includes a PUCCH waveform.

In some examples of the method, first network entities, and non-transitory computer-readable medium described herein, the RAR message includes an indication of a TAC for application to communications from the second network entity to the first network entity.

In some examples of the method, first network entities, and non-transitory computer-readable medium described herein, a default TAC for the first uplink message may be zero.

In some examples of the method, first network entities, and non-transitory computer-readable medium described herein, the RAR message may be a compact RAR message that may be received via a PDCCH and the compact RAR message does not include resource allocation information associated with one or more physical downlink data channels.

An apparatus or k entity for wireless communication is described. The apparatus may include a processing system configured to, perform a CFRA procedure, where, to perform the CFRA procedure, the processing system is configured to, transmit, to a second network entity, a first uplink message via a first resource associated with a first resource index and via a first waveform type, receive, from the second network entity and in response to the first uplink message, a RAR message, and transmit, to the second network entity and in response to the RAR message, a second uplink message via a second resource associated with the first resource index and via the first waveform type.

In some examples of the apparatus, to perform the CFRA procedure, the processing system may be configured to receive, from the second network entity, control information that includes one or more of, an indication of the first waveform type, a first time duration for monitoring a PDCCH for the RAR message after transmission of the first uplink message, and a second time duration during which resources may be available for uplink transmissions during the CFRA procedure, where the first resource and the second resource may be valid for uplink messages of the CFRA procedure within the second time duration.

In some examples of the apparatus, the first time duration overlaps with the second time duration and the second time duration extends later in time than the first time duration.

In some examples of the apparatus, the first resource and the second resource include PRACH occasions and the first waveform type includes a CFRA preamble.

In some examples of the apparatus, the first resource and the second resource include PUCCH occasions and the first waveform type includes a PUCCH waveform.

In some examples of the apparatus, a cyclic prefix associated with the PUCCH waveform may be longer than a RTT associated with communication between the first network entity and the second network entity.

In some examples of the apparatus, to perform the CFRA procedure, the processing system may be configured to receive, from the second network entity, a control message that includes an indication of the association between the transmit beam and the downlink reference signal beam.

In some examples of the apparatus, the RAR message includes an indication of a TAC for application to subsequent uplink communications from the first network entity to the second network entity and transmission of the second uplink message may be based on the TAC.

In some examples of the apparatus, transmission of the first uplink message may be based on a default TAC and the default TAC may be zero.

In some examples of the apparatus, the RAR message may be a compact RAR message that may be received via a PDCCH and the compact RAR message does not include resource allocation information associated with one or more physical downlink data channels.

Another apparatus or k entity for wireless communication is described. The apparatus may include a processing system configured to, perform a CFRA procedure, where, to perform the CFRA procedure, the processing system is configured to, receive, from a second network entity, a first uplink message via a first resource associated with a first resource index and via a first waveform type, transmit, to the second network entity and in response to the first uplink message, a RAR message, and receive, from the second network entity and in response to the RAR message, a second uplink message via a second resource associated with the first resource index and via the first waveform type.

In some examples of the apparatus, to perform the CFRA procedure, the processing system may be configured to transmit, to the second network entity, control information that includes one or more of, an indication of the first waveform type, a first time duration for monitoring a PDCCH for the RAR message after transmission of the first uplink message, and a second time duration during which resources may be available for uplink transmissions during the CFRA procedure, where the first resource and the second resource may be valid for uplink messages of the CFRA procedure within the second time duration.

In some examples of the apparatus, the first time duration overlaps with the second time duration and the second time duration extends later in time than the first time duration.

In some examples of the apparatus, the first resource and the second resource include PRACH occasions and the first waveform type includes a CFRA preamble.

In some examples of the apparatus, the first resource and the second resource include PUCCH occasions and the first waveform type includes a PUCCH waveform.

In some examples of the apparatus, a cyclic prefix associated with the PUCCH waveform may be longer than a RTT associated with communication between the first network entity and the second network entity.

In some examples of the apparatus, to perform the CFRA procedure, the processing system may be configured to transmit, to the second network entity, a control message that includes an indication of the association between the transmit beam and the downlink reference signal beam.

In some examples of the apparatus, the RAR message includes an indication of a TAC for application to communications from the second network entity to the first network entity.

In some examples of the apparatus, a default TAC for the first uplink message may be zero.

In some examples of the apparatus, the RAR message may be a compact RAR message that may be received via a PDCCH and the compact RAR message does not include resource allocation information associated with one or more physical downlink data channels.

Another apparatus or k entity for wireless communication is described. The apparatus may include a processing system configured to, perform a CFRA procedure, where, to perform the CFRA procedure, the processing system is configured to, receive, from a second network entity, configuration information for the CFRA procedure, where the configuration information includes one or more resources available for transmission of a first uplink message and of a second uplink message, where the one or more resources are each associated with a first waveform type, and where the second uplink message is configured to be responsive to a RAR message triggered by the first uplink message, transmit, to the second network entity, the first uplink message via the one or more resources and via a first waveform that is of the first waveform type associated with the one or more resources, monitor, responsive to the first uplink message, for the RAR message be, and refrain from transmitting, to the second network entity, the second uplink message based on failure to receive the RAR message.

In some examples of the apparatus, non-transmission of the second uplink message may be indicative of the failure of the first network entity to receive the RAR message.

In some examples of the apparatus, to perform the CFRA procedure, the processing system may be configured to receive, from the second network entity, control information that includes one or more of, an indication of the first waveform type, a first time duration for monitoring a PDCCH for the RAR message after transmission of the first uplink message, and a second time duration during which resources may be available for uplink transmissions during the CFRA procedure, where the one or more resources may be valid for uplink messages of the CFRA procedure within the second time duration.

In some examples of the apparatus, the first time duration overlaps with the second time duration and the second time duration extends later in time than the first time duration.

In some examples of the apparatus, the one or more resources include PRACH occasions and the first waveform type includes a CFRA preamble.

In some examples of the apparatus, the one or more resources include PUCCH occasions and the first waveform type includes a PUCCH waveform.

In some examples of the apparatus, the RAR message includes an indication of a TAC for application to communications from the first network entity to the second network entity.

In some examples of the apparatus, transmission of the first uplink message may be based on a default TAC and the default TAC may be zero.

In some examples of the apparatus, the RAR message may be a compact RAR message that may be received via a PDCCH and the compact RAR message does not include resource allocation information associated with one or more physical downlink data channels.

Another apparatus or k entity for wireless communication is described. The apparatus may include a processing system configured to, perform a CFRA procedure, where, to perform the CFRA procedure, the processing system is configured to, transmit, to a second network entity, configuration information for the CFRA procedure, where the configuration information includes one or more resources available for transmission by the second network entity of a first uplink message and of a second uplink message, where the one or more resources are each associated with a first waveform type, and where the second uplink message is configured to be responsive to a RAR message triggered by the first uplink message, receive, from the second network entity, the first uplink message via the one or more resources and via a first waveform that is of the first waveform type associated with the one or more resources, transmit, to the second network entity and responsive to the first uplink message, the RAR message, monitor, responsive to the RAR message, for the second uplink message, and determine that absence of a reception of the second uplink message is indicative of a failure of the second network entity to receive the RAR message.

In some examples of the apparatus, to perform the CFRA procedure, the processing system may be configured to transmit, to the second network entity, control information that includes one or more of, an indication of the first waveform type, a first time duration for monitoring a PDCCH for the RAR message after transmission of the first uplink message, and a second time duration during which resources may be available for uplink transmissions during the CFRA procedure, where the one or more resources may be valid for uplink messages of the CFRA procedure within the second time duration.

In some examples of the apparatus, the first time duration overlaps with the second time duration and the second time duration extends later in time than the first time duration.

In some examples of the apparatus, the one or more resources include PRACH occasions and the first waveform type includes a CFRA preamble.

In some examples of the apparatus, the one or more resources include PUCCH occasions and the first waveform type includes a PUCCH waveform.

In some examples of the apparatus, the RAR message includes an indication of a TAC for application to communications from the second network entity to the first network entity.

In some examples of the apparatus, a default TAC for the first uplink message may be zero.

In some examples of the apparatus, the RAR message may be a compact RAR message that may be received via a PDCCH and the compact RAR message does not include resource allocation information associated with one or more physical downlink data channels.

DETAILED DESCRIPTION

Figure 1:
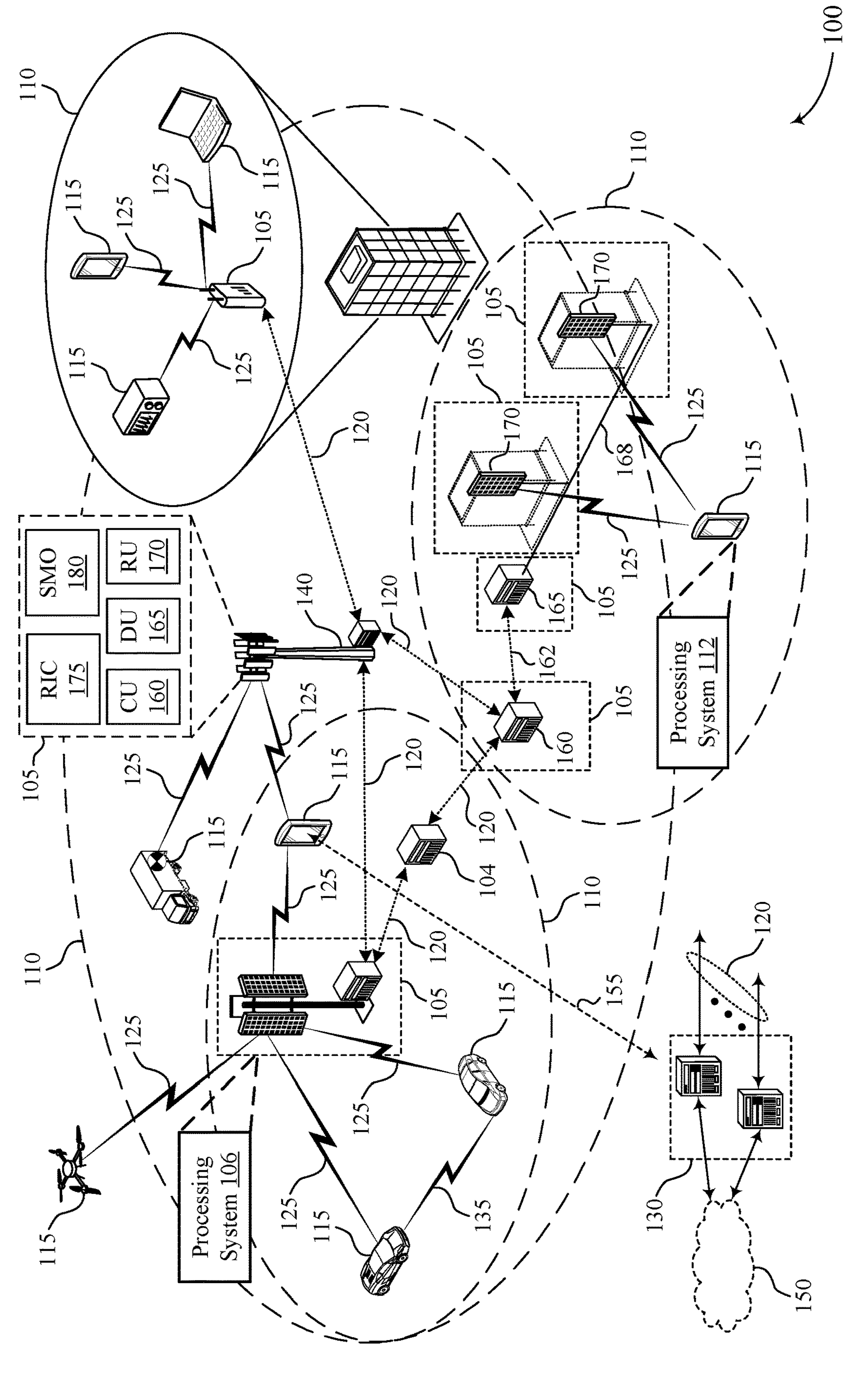
FIG. 1 shows an example of a wireless communications system that supports reusing waveform types for contention-free random access (CFRA) procedures in accordance with one or more aspects of the present disclosure.

In some wireless communication systems, a UE may perform a contention-free random access (CFRA) procedure to initiate a connection with a network entity. For example, the UE may perform a two-step or a four-step CFRA procedure by transmitting a first CFRA message (e.g., msg1 or msgA) to the network entity and monitoring for a random access response (RAR) message (e.g., msg2 or msgB) from the network entity. The UE may transmit a message (e.g., an acknowledgment (ACK) or negative acknowledgment (NACK) message) in response to receiving (e.g., or failing to receive) the second CFRA message. In some examples, the UE may use a first waveform type and first resources (e.g., a random access channel (RACH) preamble and a RACH occasion (RO)) to transmit the first CFRA message, and a second waveform type and second resources (e.g., a physical uplink control channel (PUCCH) waveform and a PUCCH occasion) to transmit the ACK or NACK message. However, using both of the first waveform type and the second waveform type in the CFRA procedure may increase resource fragmentation, signaling overhead, and processing associated with waveform configuration, and may decrease a resource utilization efficiency of the CFRA procedure.

Accordingly, techniques described herein may enable the UE to reuse a same waveform type for both of the first CFRA message and an ACK message. That is, in some aspects, the UE may transmit the first CFRA message using a RACH preamble via a first RO with a first RO index, and may retransmit the RACH preamble via a second RO with the first RO index (e.g., in response to receiving the RAR message). In some aspects, the UE may transmit the first CFRA message using a PUCCH waveform via a first PUCCH occasion with a first PUCCH index, and may retransmit the PUCCH waveform via a second PUCCH occasion with the first PUCCH index (e.g., in response to receiving the RAR message). The first RO and the second RO (e.g., or the first PUCCH occasion and the second PUCCH occasion) may fall within a first time window $T_w$, which may be preconfigured to the UE. The RAR message may be a compact RAR message. That is, the RAR message may indicate a frequency or time domain resource allocation for a downlink message, and may not indicate resources for the ACK message.

In some examples, the UE may not receive the RAR message. That is, the UE may be configured with a second time window (e.g., a RAR window) for monitoring for the RAR message, and may not successfully receive and/or decode the RAR message before expiration of the second time window. In such examples, the UE may not retransmit the waveform in response to receiving the RAR message (e.g., the UE may perform discontinued transmission (DTX)). That is, if the network entity does not receive the response to the RAR message (e.g., before expiration of the first time window), the network entity may interpret the DTX as a NACK.

Aspects of the disclosure are initially described in the context of wireless communications systems. Aspects of the disclosure are further illustrated by and described with reference to timing diagrams and process flow diagrams. Aspects of the disclosure are further illustrated by and described with reference to apparatus diagrams, system diagrams, and flowcharts that relate to reusing waveform types for CFRA procedures.

FIG. 1 shows an example of a wireless communications system 100 that supports reusing waveform types for CFRA procedures in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a network entity (which may alternatively be referred to as an entity, a node, a network node, or a wireless entity) may be, be similar to, include, or be included in (e.g., be a component of) a base station (e.g., any base station described herein, including a disaggregated base station), a UE (e.g., any UE described herein), a reduced capability (RedCap) device, an enhanced reduced capability (eRedCap) device, an ambient internet-of-things (IoT) device, an energy harvesting (EH)-capable device, a network controller, an apparatus, a device, a computing system, an integrated access and backhauling (IAB) node, a distributed unit (DU), a central unit (CU), a remote/radio unit (RU) (which may also be referred to as a remote radio unit (RRU)), and/or another processing entity configured to perform any of the techniques described herein. For example, a network entity may be a UE. As another example, a network entity may be a base station. As used herein, "network entity" may refer to an entity that is configured to operate in a network, such as the network 105. For example, a "network entity" is not limited to an entity that is currently located in and/or currently operating in the network. Rather, a network entity may be any entity that is capable of communicating and/or operating in the network.

The adjectives "first," "second," "third," and so on are used for contextual distinction between two or more of the modified noun in connection with a discussion and are not meant to be absolute modifiers that apply only to a certain respective entity throughout the entire document. For example, a network entity may be referred to as a "first network entity" in connection with one discussion and may be referred to as a "second network entity" in connection with another discussion, or vice versa. As an example, a first network entity may be configured to communicate with a second network entity or a third network entity. In one aspect of this example, the first network entity may be a UE, the second network entity may be a base station, and the third network entity may be a UE. In another aspect of this example, the first network entity may be a UE, the second network entity may be a base station, and the third network entity may be a base station. In yet other aspects of this example, the first, second, and third network entities may be different relative to these examples.

Similarly, reference to a UE, base station, apparatus, device, computing system, or the like may include disclosure of the UE, base station, apparatus, device, computing system, or the like being a network entity. For example, disclosure that a UE is configured to receive information from a base station also discloses that a first network entity is configured to receive information from a second network entity. Consistent with this disclosure, once a specific example is broadened in accordance with this disclosure (e.g., a UE is configured to receive information from a base station also discloses that a first network entity is configured to receive information from a second network entity), the broader example of the narrower example may be interpreted in the reverse, but in a broad open-ended way. In the example above where a UE is configured to receive information from a base station also discloses that a first network entity is configured to receive information from a second network entity, the first network entity may refer to a first UE, a first base station, a first apparatus, a first device, a first computing system, a first set of one or more one or more components, a first processing entity, or the like configured to receive the information; and the second network entity may refer to a second UE, a second base station, a second apparatus, a second device, a second computing system, a second set of one or more components, a second processing entity, or the like.

As described herein, communication of information (e.g., any information, signal, or the like) may be described in various aspects using different terminology. Disclosure of one communication term includes disclosure of other communication terms. For example, a first network entity may be described as being configured to transmit information to a second network entity. In this example and consistent with this disclosure, disclosure that the first network entity is configured to transmit information to the second network entity includes disclosure that the first network entity is configured to provide, send, output, communicate, or transmit information to the second network entity. Similarly, in this example and consistent with this disclosure, disclosure that the first network entity is configured to transmit information to the second network entity includes disclosure that the second network entity is configured to receive, obtain, or decode the information that is provided, sent, output, communicated, or transmitted by the first network entity.

As shown, the network entity (e.g., network entity 105) may include a processing system 106. Similarly, the network entity (e.g., UE 115) may include a processing system 112. A processing system may include one or more components (or subcomponents), such as one or more components described herein. For example, a respective component of the one or more components may be, be similar to, include, or be included in at least one memory, at least one communication interface, or at least one processor. For example, a processing system may include one or more components. In such an example, the one or more components may include a first component, a second component, and a third component. In this example, the first component may be coupled to a second component and a third component. In this example, the first component may be at least one processor, the second component may be a communication interface, and the third component may be at least one memory. A processing system may generally be a system one or more components that may perform one or more functions, such as any function or combination of functions described herein. For example, one or more components may receive input information (e.g., any information that is an input, such as a signal, any digital information, or any other information), one or more components may process the input information to generate output information (e.g., any information that is an output, such as a signal or any other information), one or more components may perform any function as described herein, or any combination thereof. As described herein, an "input" and "input information" may be used interchangeably. Similarly, as described herein, an "output" and "output information" may be used interchangeably. Any information generated by any component may be provided to one or more other systems or components of, for example, a network entity described herein). For example, a processing system may include a first component configured to receive or obtain information, a second component configured to process the information to generate output information, and/or a third component configured to provide the output information to other systems or components. In this example, the first component may be a communication interface (e.g., a first communication interface), the second component may be at least one processor (e.g., that is coupled to the communication interface and/or at least one memory), and the third component may be a communication interface (e.g., the first communication interface or a second communication interface). For example, a processing system may include at least one memory, at least one communication interface, and/or at least one processor, where the at least one processor may, for example, be coupled to the at least one memory and the at least one communication interface.

A processing system of a network entity described herein may interface with one or more other components of the network entity, may process information received from one or more other components (such as input information), or may output information to one or more other components. For example, a processing system may include a first component configured to interface with one or more other components of the network entity to receive or obtain information, a second component configured to process the information to generate one or more outputs, and/or a third component configured to output the one or more outputs to one or more other components. In this example, the first component may be a communication interface (e.g., a first communication interface), the second component may be at least one processor (e.g., that is coupled to the communication interface and/or at least one memory), and the third component may be a communication interface (e.g., the first communication interface or a second communication interface). For example, a chip or modem of the network entity may include a processing system. The processing system may include a first communication interface to receive or obtain information, and a second communication interface to output, transmit, or provide information. In some examples, the first communication interface may be an interface configured to receive input information, and the information may be provided to the processing system. In some examples, the second system interface may be configured to transmit information output from the chip or modem. The second communication interface may also obtain or receive input information, and the first communication interface may also output, transmit, or provide information.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an IAB network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a CU 160, a DU 165, a RU 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a RRU, or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support reusing waveform types for CFRA procedures as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an IoT device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max}\cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some wireless communication systems, a UE 115 may perform a CFRA procedure to initiate a connection with a network entity 105. Techniques described herein may enable the UE 115 to reuse a same waveform type for both of a first CFRA message and an ACK message for an RAR from the network entity 105. That is, in some aspects, the UE 115 may transmit the first CFRA message using a RACH preamble or a PUCCH waveform via a first RO with a first RO index or a first PUCCH occasion with a first PUCCH occasion index. The UE 115 may retransmit the RACH preamble (e.g., or PUCCH waveform) via a second RO with the first RO index (e.g., or via a second PUCCH occasion with the first PUCCH index). The first RO and the second RO (e.g., or the first PUCCH occasion and the second PUCCH occasion) may fall within a first time window $T_w$, which may be preconfigured to the UE 115 by the network entity 105.

In some examples, the UE 115 may not receive the RAR message. That is, the UE may be configured with a second time window (e.g., a RAR window) for monitoring for the RAR message, and may not successfully receive and/or decode the RAR message before expiration of the second time window. In such examples, the UE 115 may not retransmit the waveform in response to receiving the RAR message. That is, if the network entity 105 does not receive the response to the RAR message before expiration of the first time window, the network entity 105 may determine that the UE 115 did not receive and/or decode the RAR message.

Figure 2:
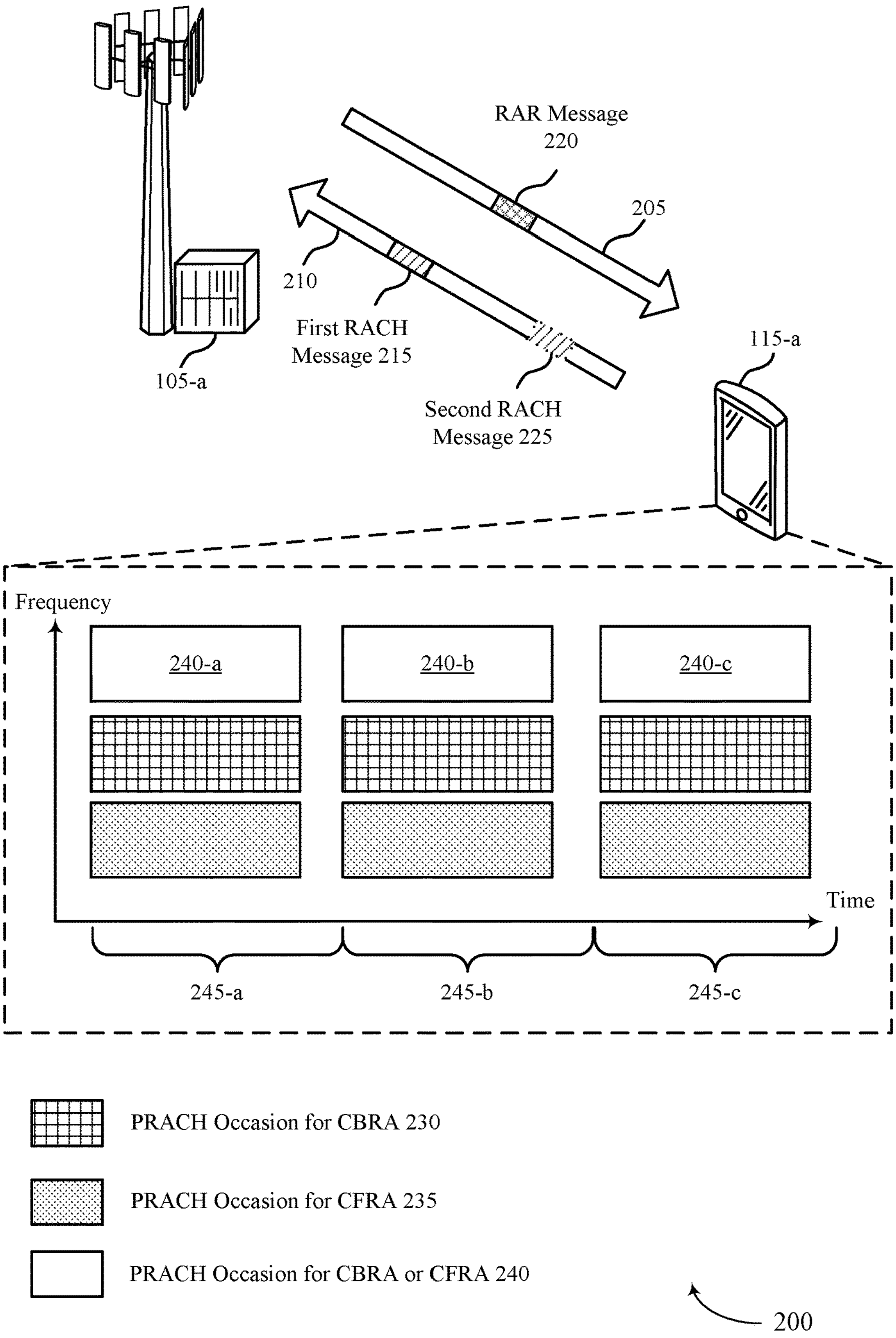
FIG. 2 shows an example of a wireless communications system that supports reusing waveform types for CFRA procedures in accordance with one or more aspects of the present disclosure.

FIG. 2 shows an example of a wireless communications system 200 that supports reusing waveform types for CFRA procedures in accordance with one or more aspects of the present disclosure. The wireless communications system 200 may implement or may be implemented by aspects of the wireless communications system 100. For example, the wireless communications system 200 may include a UE 115 (e.g., a UE 115-*a*) and a network entity 105 (e.g., a network entity 105-*a*), which may be examples of the corresponding devices as described with reference to FIG. 1.

In some examples, a UE 115-*a* may initiate a random access procedure to establish a connection with a network entity 105-*a*. That is, the UE 115-*a* may initiate a two-step or a four-step CFRA procedure or contention-based random access (CBRA) procedure. In such random access procedures, the UE 115-*a* may transmit a first RACH message 215 to the network entity 105-*a* using a waveform such as a RACH preamble (e.g., via an uplink channel 210). In a CBRA procedure, the UE 115-*a* may select (e.g., randomly select) the RACH preamble for the first RACH message 215. In a CFRA procedure, the UE 115-*a* may receive an indication from the network entity 105-*a* of the RACH preamble for the first RACH message 215 (e.g., via a downlink channel 205). For example, the network entity 105-*a* may transmit an indication of a CFRA preamble index associated with a CFRA preamble for the UE 115-*a* to transmit the first RACH message 215. The CFRA index indication may be, for example, in a radio resource control (RRC) message, a downlink control information (DCI) message, or a medium access control-control element (MAC-CE). In such CFRA procedures, the UE 115-*a* may be in a connected mode with the network entity 105-*a* (e.g., prior to receiving the indication of the RACH preamble).

The UE 115-*a* may be configured with or may receive an indication of one or more resources (e.g., RACH occasions (ROs)) for the UE 115-*a* to transmit the first RACH message 215. For example, for CFRA procedures, the UE 115-*a* may receive an indication to transmit the first RACH message 215 via a PRACH occasion for CFRA 235 or via a PRACH occasion for CBRA or CFRA 240. For CBRA procedures, the UE 115-*a* may be configured to transmit the first RACH message 215 via a PRACH occasion for CBRA 230 or a PRACH occasion for CBRA or CFRA 240. The UE 115-*a* may receive the indication of the RO via a RRC, DCI, or MAC-CE message. The UE 115-*a* may transmit the first RACH message 215 using a timing advance command (TAC) (e.g., a time offset to account for propagation delay) of N_TA=0.

In response to the first RACH message 215 (e.g., a msg1 for a four-step RACH procedure or msgA for a two-step RACH procedure), the UE 115-*a* may monitor for a RAR message 220 (e.g., a msg2 for a four-step RACH procedure or msgB for a two-step RACH procedure) from the network entity 105-*a*. A physical downlink control channel (PDCCH) portion of the RAR message 220 may include a PUCCH resource indicator field indicating one or more PUCCH occasions for the UE 115-*a* to transmit a second RACH message 220. The PDCCH portion of the RAR message 220 may include a frequency domain resource allocation and a time domain resource allocation (FDRA/TDRA) field for a physical downlink shared channel (PDSCH) portion of the RAR message 220. The PDSCH portion of the RAR message may indicate a TAC N_TA* and a random access preamble index (RAPID) for the UE 115-*a* to use for further communications with the network entity 105-*a* (e.g., including the second RACH message 225).

In some examples, the UE 115-*a* may receive a configuration indicating a window to monitor for the RAR message 220. To complete the CFRA procedure, the UE 115-*a* may transmit the second RACH message 225 indicating an ACK or a NACK. That is, the UE 115-*a* may transmit an acknowledgment message (e.g., a HARQ-ACK message) to the network entity 105-*a* if the UE 115-*a* successfully receives the RAR message 220 within the configured window. The UE 115-*a* may transmit a NACK message to the network entity 105-*a* if the UE 115-*a* does not successfully receive the RAR message 220 within the configured window. In some examples (e.g., in 4G/LTE or 5G/NR wireless communication systems), the network entity 105-*a* may configure the UE 115-*a* with resources (e.g., time/frequency PUCCH resources) and a waveform via which the UE 115-*a* may transmit the HARQ-ACK or NACK message. The PUCCH resources and waveform may be different from the ROs and RACH preamble used to transmit the first RACH message 215. In CFRA procedures, the network entity 105-*a* may reserve the PRACH preamble assigned to the UE 115-*a* and may not release the reserved PRACH preamble until reception of the second RACH message 225.

In some examples, generating and transmitting both of the RACH preamble waveform for the first RACH message 215 and the PUCCH waveform for the second RACH message 225 may increase processing at the UE 115-*a*. Accordingly, techniques described herein may allow for the UE 115-*a* to reuse waveforms (e.g., and frequency resources) for the first RACH message 215 and the second RACH message 225 in CFRA procedures.

In some aspects, the UE 115-*a* may reuse one of a RACH preamble waveform or a PUCCH waveform to transmit both of the first RACH message 215 and the second RACH message 225. That is, in some aspects, the UE 115-*a* may receive an indication (e.g., via RRC, DCI, or MAC-CE) to transmit the first RACH message 215 via an indicated RO associated with an RO index and an using a RACH preamble waveform associated with an indicated CFRA preamble index. In some aspects, an RO associated with the RO index may be reserved for the UE for more than one RO configuration period 245 (e.g., within a time window $T_w$). That is, the network entity 105-*a* may reserve an RO 240-*a*, an RO 240-*b*, and an RO 240-*c* associated with the RO index during an RO configuration period 245-*a*, an RO configuration period 245-*b*, and an RO configuration period 245-*c*. The time window $T_w$ may overlap with and extend later in time than the RAR window.

The UE 115-*a* may transmit the first RACH message 215, for example, via the RO 240-*a* and using the RACH preamble waveform associated with the indicated CFRA preamble index. The UE 115-*a* may monitor for a RAR message 220 in response to the first RACH message 215 during the RAR window. If the UE 115-*a* detects the RAR message 220 during the RAR window, the UE 115-*a* may transmit the second RACH message 225 by retransmitting the RACH preamble waveform associated with the indicated CFRA preamble index in the RO 240-*b* or the RO 240-*c* associated with the RO index (e.g., within the time window $T_w$). If the UE 115-*a* does not detect the RAR message 220 during the RAR window, the UE 115-*a* may not retransmit the RACH preamble waveform (e.g., may perform a DTX). Accordingly, the network entity 105-*a* may interpret a retransmission of the RACH preamble waveform as an ACK for the RAR message 220 and may interpret an absence of a retransmission of the RACH preamble (e.g., a DTX) during the window $T_w$ as a NACK for the RAR message 220.

In some aspects, the UE 115-*a* may reuse a PUCCH waveform and PUCCH occasions for both of the first RACH message 215 and the second RACH message 225. That is, as described with reference to RACH waveform reuse, the UE 115-*a* may transmit the first RACH message 215 using a PUCCH waveform and a PUCCH occasion associated with a PUCCH index. If the UE 115-*a* detects the RAR response message 220 during the RAR window, the UE 115-*a* may retransmit the PUCCH waveform for the second RACH message 225 via a second PUCCH occasion associated with the PUCCH index (e.g., within the configured time window $T_w$). If the UE 115-*a* does not detect the RAR response message 220 during the RAR window, the UE 115-*a* may not retransmit the PUCCH waveform.

In such examples, a round trip time (RTT) for radio wave propagation between the UE 115-*a* and the network entity 105-*a* may be shorter than a cyclic prefix (CP) of the PUCCH waveform. The UE 115-*a* may receive a configuration for a resource set associated with the PUCCH occasions periodically and sequentially (e.g., in a time and/or frequency domain). The UE 115-*a* may use a transmit beam associated with a downlink reference signal beam to transmit the PUCCH waveform. That is, the transmit beam may be a same beam used to receive a downlink reference signal. The network entity 105-*a* may transmit a configuration to the UE 115-*a* (e.g., semi-statically via a system information (SI) message, an RRC message, or a MAC-CE message) indicating the association between the transmit beam and the downlink reference signal beam.

In some examples (e.g., for a two-step CFRA procedure), the UE 115-*a* may map the PUCCH occasion or RO for the first RACH message 215 to a physical uplink shared channel (PUSCH) resource. The UE 115-*a* may accordingly transmit the RACH preamble waveform or the PUCCH waveform via the transmit beam in the PUCCH occasion or RO, and may transmit a payload for the first RACH message 215 via the transmit beam in the mapped PUSCH resource (e.g., using a TAC of N_TA=0).

In some examples, the network entity 105-*a* may transmit a compact RAR message 220 in response to the first RACH message 215. That is, if the UE 115-*a* reuses a waveform (e.g., and a resource occasion index) for both of the first RACH message 215 and the second RACH message 225 (e.g., the HARQ-ACK to msg2/msgB), the network entity 105-*a* (e.g., a primary cell (spCell) or a secondary cell (sCell) associated with the CFRA procedure) may waive configuration of PUCCH resources for the second RACH message 225. Accordingly, the network entity 105-*a* may transmit a compact RAR 220 including a PDCCH (e.g., and not a PUCCH or PDSCH resource indication). The network entity 105-*a* may repurpose a PUCCH resource indicator field and a PDSCH FDRA/TDRA field to indicate the RAPID and TA command for the CFRA procedure. Thus, the network entity 105-*a* may not schedule the PDSCH of the RAR message and may not configure PUCCH resources for the UE 115-*a*, which may reduce signaling overhead as compared to non-compact RAR messages 220.

Figure 3A:
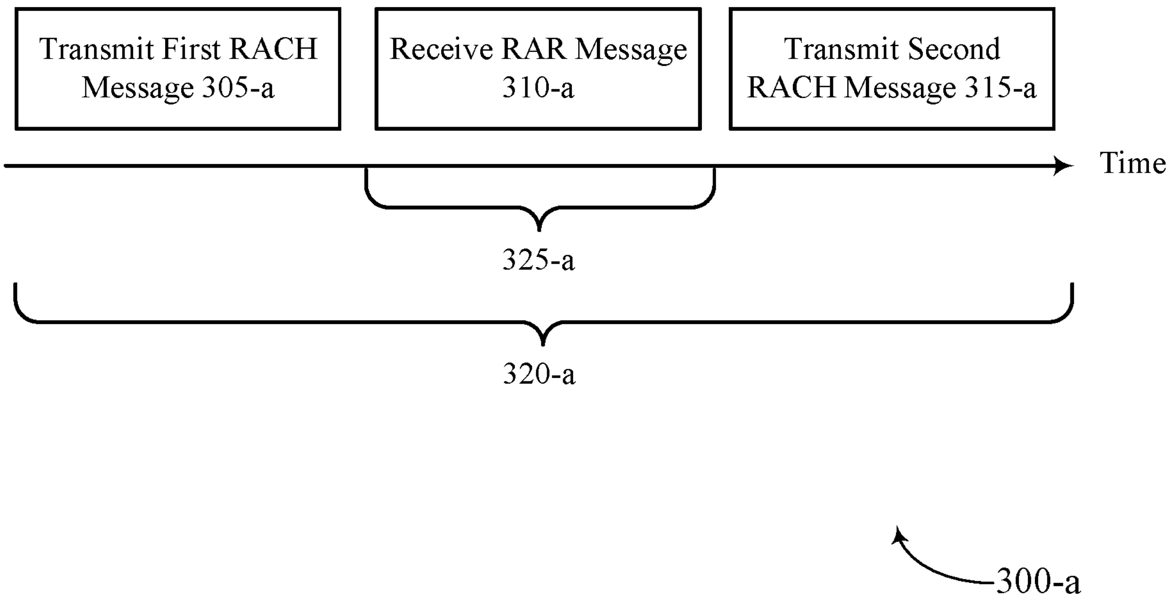
FIGS. 3A and 3B show an example of timing diagrams that support reusing waveform types for CFRA procedures in accordance with one or more aspects of the present disclosure.
Figure 3B:
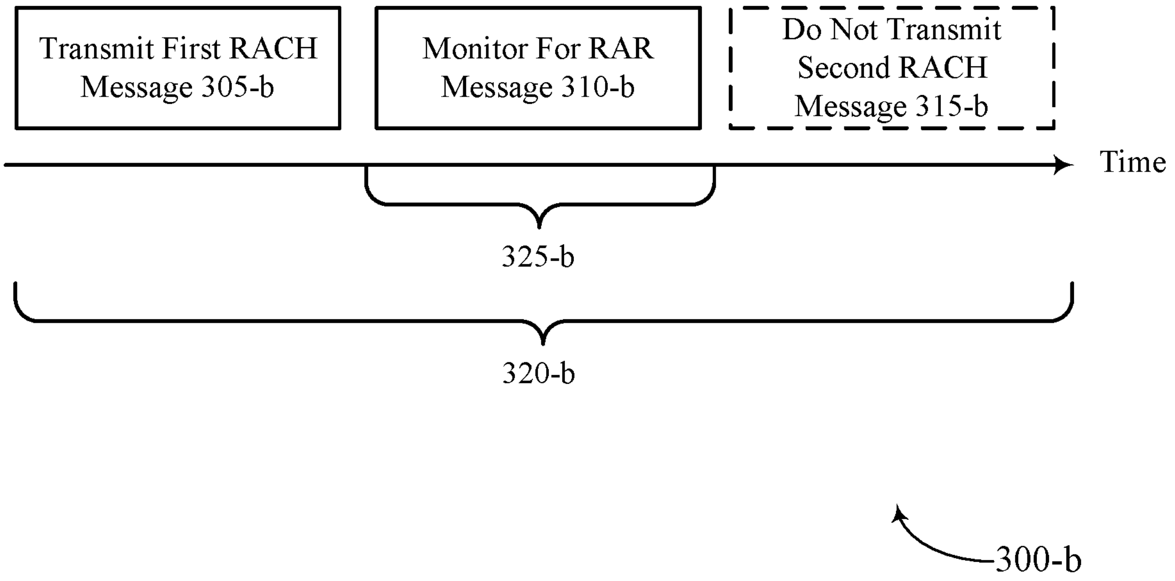

FIGS. 3A and 3B show examples of a timing diagram 300-*a* and a timing diagram 300-*b* that support reusing waveform types for CFRA procedures in accordance with one or more aspects of the present disclosure. The timing diagram 300-*a* and the timing diagram 300-*b* may implement or may be implemented by aspects of the wireless communications system 100 or the wireless communications system 200. For example, the timing diagram 300-*a* and the timing diagram 300-*b* may be implemented by a UE 115 and a network entity 105, which may be examples of the corresponding devices as described with reference to FIG. 1.

As illustrated with reference to the timing diagram 300-*a*, to perform a two-step or four-step CFRA procedure, a UE 115 may transmit a first RACH message 305-*a* to a network entity 105 (e.g., a spCell or a SCell). That is, the UE 115 may receive a configuration message (e.g., an RRC, DCI, or MAC-CE message) indicating a dedicated CFRA preamble index associated with a RACH preamble and a RO associated with the CFRA preamble. The RO may be reserved for the UE 115 during one or more RO configuration periods associated with CFRA (e.g., within a time window/timer $T_w$ 320-*a* for CFRA preamble/PUCCH configuration). A length of the window $T_w$ 320-*a* may be provided in an SI, RRC, or MAC-CE message. The configuration of the window $T_w$ 320-*a* may depend on a priority of the CFRA procedure or a capability of the UE 115. In some aspects, the configuration message may indicate a RAR window 325-*a* for the UE 115 to monitor for a RAR message 310-*a*. The UE 115 may transmit the first RACH message 305-*a* (e.g., msg1 or msgA for a four-step or two-step CFRA procedure, respectively) to the network entity via the RO and using the RACH preamble.

The UE 115 may monitor for a RAR message 310-*a* in response to the first RACH message 305-*a* during the RAR window 325-*a* (e.g., starting in a first PDCCH occasion after the UE 115 transmits the first RACH message 305-*a*). The UE 115 may monitor for a PDCCH of the RAR message 310-*a* with a cyclic redundancy check (CRC) that is scrambled by a UE-specific radio network temporary identifier (RNI) (e.g., a cell RNTI (C-RNTI)). In some aspects, the PDCCH may indicate a RAPID and a TA command N_TA*. In some aspects, the PDCCH may indicate a FDRA/TDRA for a PDSCH message indicating the RAPID and the TA command N_TA*. The RAR message 310-*a* may be a msg2 or a msgB (e.g., for a four-step CFRA procedure or a two-step CFRA procedure, respectively).

If the UE 115 detects the RAR message 310-*a* during the RAR window 325-*a* and obtains the RAPID and the TA command N_TA*, the UE 115 may transmit a second RACH message 315-*a* indicating an acknowledgment or success message for receiving the RAR message 310-*a*. The UE 115 may transmit the second RACH message 315-*a* by retransmitting the RACH preamble of the first RACH message 305-*a*. The UE 115 may transmit the second RACH message 315-*a* in the RO during the timer/window $T_w$ 320-*a* (e.g., the window during which the RO is reserved for the UE 115). The network entity 105 may interpret the retransmission of the RACH preamble as a HARQ-ACK for msg2 of a four-step CFRA procedure, or as a msgB SuccessRAR message for a two-step CFRA procedure.

As illustrated with reference to the timing diagram 300-*b*, to perform a two-step or four-step CFRA procedure, a UE 115 may transmit a first RACH message 305-*b* to a network entity 105 (e.g., a spCell or a SCell). That is, the UE 115 may receive a configuration message (e.g., an RRC, DCI, or MAC-CE message) indicating a dedicated CFRA preamble index associated with a RACH preamble and a RO associated with the CFRA preamble. The RO may be reserved for the UE 115 during one or more RO configuration periods associated with CFRA (e.g., within a time window/timer $T_w$ 320-*b* for CFRA preamble/PUCCH configuration). A length of the window $T_w$ 320-*b* may be provided in an SI, RRC, or MAC-CE message. The configuration of the window $T_w$ 320-*b* may depend on a priority of the CFRA procedure or a capability of the UE 115. In some aspects, the configuration message may indicate a RAR window 325-*b* for the UE 115 to monitor for a RAR message 310-*b*. The UE 115 may transmit the first RACH message 305-*b* (e.g., msg1 or msgA for a four-step or two-step CFRA procedure, respectively) to the network entity via the RO and using the RACH preamble.

The UE 115 may monitor for a RAR message 310-*b* in response to the first RACH message 305-*b* during the RAR window 325-*b* (e.g., starting in a first PDCCH occasion after the UE 115 transmits the first RACH message 305-*b*). The UE 115 may monitor for a PDCCH of the RAR message 310-*b* with a CRC that is scrambled by a UE-specific RNI (e.g., a C-RNTI). In some aspects, the PDCCH may indicate a RAPID and a TA command N_TA*. In some aspects, the PDCCH may indicate a FDRA/TDRA for a PDSCH message indicating the RAPID and the TA command N_TA*. The RAR message 310-*b* may be a msg2 or a msgB (e.g., for a four-step CFRA procedure or a two-step CFRA procedure, respectively).

If the UE 115 does not detect the RAR message 310-*b* during the RAR window 325-*b* and does not receive the RAPID and the TA command N_TA, the UE 115 may not transmit a second RACH message 315-*b*. That is, the UE 115 may perform a DTX. The network entity 105 may interpret the DTX as a HARQ-NACK for msg2 of a four-step CFRA procedure msgB for a two-step CFRA procedure. That is, if the network entity 105 does not receive the second RACH message 315-*b* during the time window $T_w$ 320-*b*, the network entity 105 may determine that the UE 115 did not obtain the RAPID and the TA command N_TA*.

Although the techniques are described herein with reference to RACH preamble waveform reuse, the UE 115 may, additionally, or alternatively, reuse a PUCCH waveform for the CFRA procedure. That is, the UE 115 may transmit both of the first RACH message 305-*a* and the second RACH message 315-*a* using a PUCCH waveform and via one or more PUCCH occasions reserved for the UE 115, as described with reference to FIG. 2.

Figure 4:
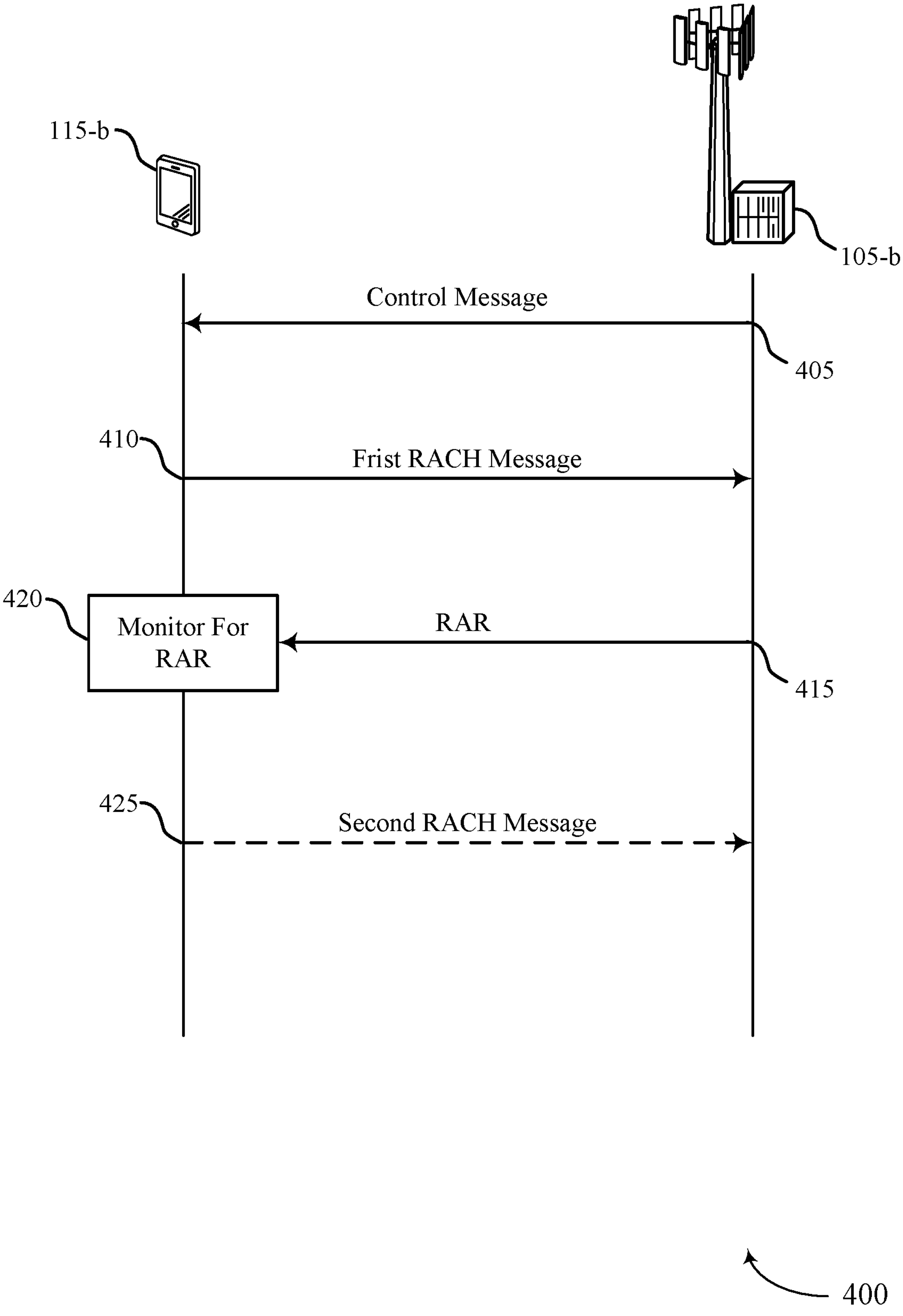
FIG. 4 shows an example of a process flow that supports reusing waveform types for CFRA procedures in accordance with one or more aspects of the present disclosure.

FIG. 4 shows an example of a process flow 400 that supports reusing waveform types for CFRA procedures in accordance with one or more aspects of the present disclosure. The process flow 400 may implement or may be implemented by aspects of the wireless communications system 100, the wireless communications system 200, the timing diagram 300-*a*, or the timing diagram 300-*b*. For example, the process flow 400 may include a UE 115 (e.g., a UE 115-*b*) and a network entity 105 (e.g., a network entity 105-*b*), which may be examples of the corresponding devices as described with reference to FIG. 1.

In the following description of the process flow 400, the operations between the UE 115-*b* and the network entity 105-*b* may be transmitted in a different order than the example order shown. Some operations may also be omitted from the process flow 400, and other operations may be added to the process flow 400. Further, although some operations or signaling may be shown to occur at different times for discussion purposes, these operations may actually occur at the same time.

At 405, the UE 115-*b* may receive, from the network entity 105-*b*, a control message that includes configuration information for a CFRA procedure. In some examples, the configuration information may include a first resource available for a first RACH message of a CFRA procedure and a second resource available for a second RACH message of a CFRA procedure. In some examples, the second RACH message may be configured to be responsive to a RAR message from the network entity 105-*b*. In some examples, the first resource and the second resource may be ROs or PUCCH occasions. The first resource and the second resource may be associated with a same resource index.

In some aspects, the UE 115-*b* may, additionally, or alternatively, receive control information from the network entity 105-*b*. The control information may include one or more of an indication of a first waveform type (e.g., a RACH preamble waveform or a PUCCH waveform), a first time duration, and a second time duration. The first time duration may be a duration for monitoring a PDCCH for an RAR message. The second time duration may be a duration during which resources (e.g., the first resource and the second resource) are available for uplink transmissions during the CFRA procedure. The second time duration may overlap with and extend further in time than the first time duration.

In some examples (e.g., if the first waveform type is a PUCCH waveform), a cyclic prefix of the PUCCH waveform may be longer than an RTT associated with communications between the UE 115-*b* and the network entity 105-*b*. In such examples, a transmit beam used to transmit the first waveform type may be associated with a downlink reference signal beam (e.g., the transmit beam may be a same beam used to receive a downlink reference signal). The association may be configured to the UE 115-*b* by the network entity 105-*b* (e.g., via a control message).

At 410, the UE 115-*b* may transmit a first RACH message (e.g., an uplink message) to the network entity 105-*b*. The UE 115-*b* may transmit the first RACH message via the first resources (e.g., during the first time duration) and via the first waveform type. The UE 115-*b* may transmit the first RACH message using a default TAC of zero.

At 415, in response to the first RACH message, the network entity 105-*b* may transmit a RAR message to the UE 115-*b*. The RAR message may include a TAC (e.g., and a RAPID) for the UE 115-*b* to apply to subsequent communications to the network entity 105-*b* (e.g., including a second RACH message). In some examples, the RAR message may be a compact RAR message. That is, the RAR message may be transmitted via the PDCCH and may not include resource allocation information for one or more PDCCH transmissions.

At 420, the UE 115-*b* may monitor the PDCCH for the RAR message. That is, the UE 115-*b* may monitor for the RAR message during the first time duration. In some examples, the UE 115-*b* may receive and decode the RAR message. In some examples, the UE 115-*b* may not successfully receive and decode the RAR message.

In some examples, at 425, the UE 115-*b* may transmit the second RACH message (e.g., a second uplink message) in response to the RAR message. That is, the UE 115-*b* may transmit the second RACH message to indicate that the UE 115-*b* successfully received and decoded the RAR message. The UE 115-*b* may transmit the second RACH message via the second resources (e.g., during the second time duration) and via the first waveform type. The UE 115-*b* may transmit the second RACH message using the TAC (e.g., and RAPID) indicated in the RAR message.

In some examples, the UE 115-*b* may refrain from transmitting the second RACH message. That is, the UE 115-*b* may refrain from transmitting the second RACH message to indicate that the UE 115-*b* did not successfully receive and decode the RAR message. The network entity 105-*b* may determine that the absence of reception of the second RACH message is indicative for a failure of the UE 115-*b* to receive the RAR message.

Figure 5:
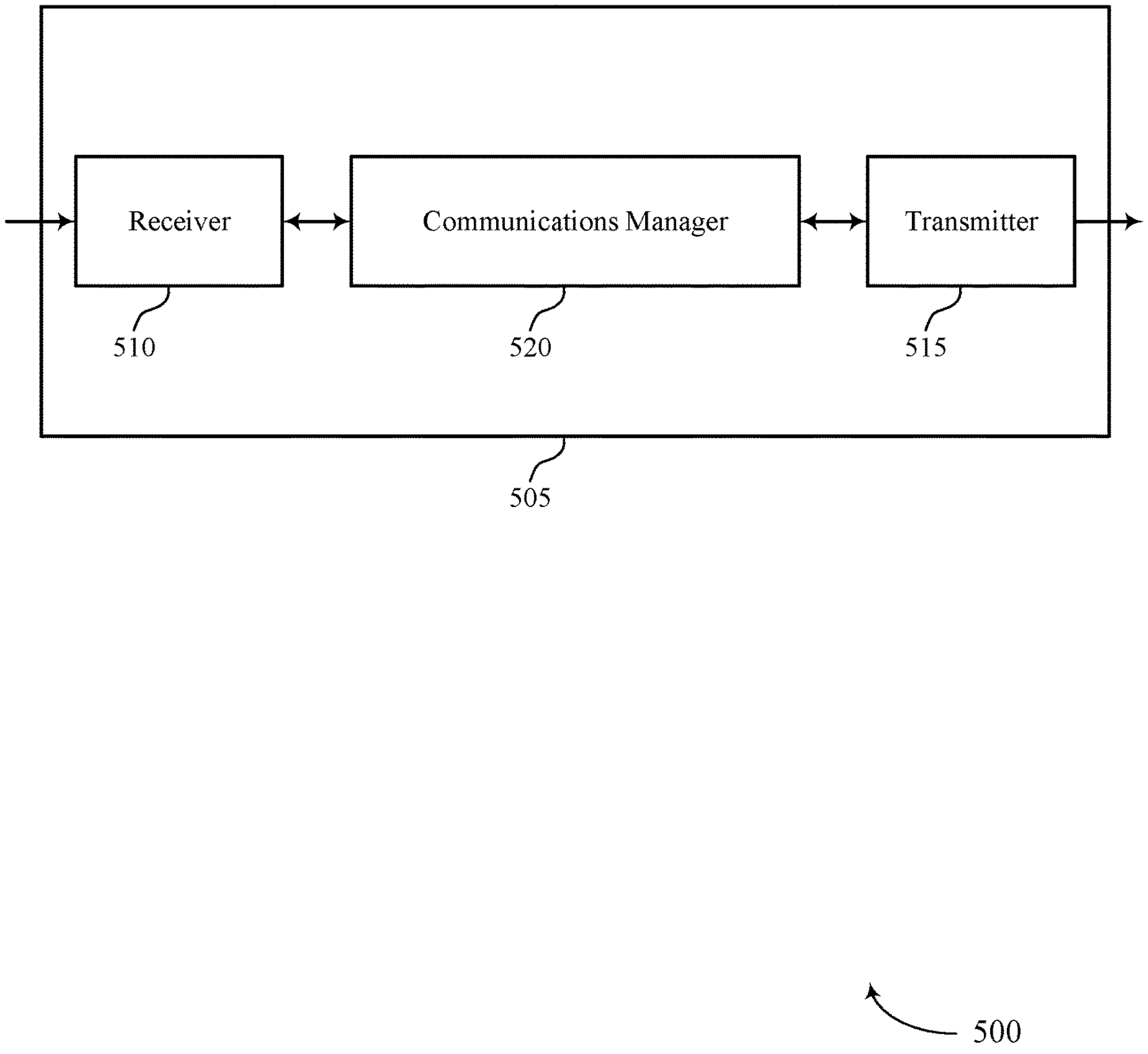
FIGS. 5 and 6 show block diagrams of devices that support reusing waveform types for CFRA procedures in accordance with one or more aspects of the present disclosure.

FIG. 5 shows a block diagram 500 of a device 505 that supports reusing waveform types for CFRA procedures in accordance with one or more aspects of the present disclosure. The device 505 may be an example of aspects of a UE 115 as described herein. The device 505 may include a receiver 510, a transmitter 515, and a communications manager 520. The device 505, or one or more components of the device 505 (e.g., the receiver 510, the transmitter 515, and the communications manager 520), may include at least one processor, which may be coupled with at least one memory, to, individually or collectively, support or enable the described techniques. Each of these components may be in communication with one another (e.g., via one or more buses).

The receiver 510 may provide a means for receiving information such as packets, user data, control information, or any combination thereof associated with various information channels (e.g., control channels, data channels, information channels related to reusing waveform types for CFRA procedures). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to reusing waveform types for CFRA procedures). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of reusing waveform types for CFRA procedures as described herein. For example, the communications manager 520, the receiver 510, the transmitter 515, or various combinations or components thereof may be capable of performing one or more of the functions described herein.

In some examples, the communications manager 520, the receiver 510, the transmitter 515, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 520, the receiver 510, the transmitter 515, or various combinations or components thereof may be implemented in code (e.g., as communications management software or firmware) executed by at least one processor. If implemented in code executed by at least one processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication in accordance with examples as disclosed herein. For example, the communications manager 520 is capable of, configured to, or operable to support a means for performing a CFRA procedure. The communications manager 520 is capable of, configured to, or operable to support a means for transmitting, to a second network entity, a first uplink message via a first resource associated with a first resource index and via a first waveform type. The communications manager 520 is capable of, configured to, or operable to support a means for receiving, from the second network entity and in response to the first uplink message, a random access response message. The communications manager 520 is capable of, configured to, or operable to support a means for transmitting, to the second network entity and in response to the random access response message, a second uplink message via a second resource associated with the first resource index and via the first waveform type.

Additionally, or alternatively, the communications manager 520 may support wireless communication in accordance with examples as disclosed herein. For example, the communications manager 520 is capable of, configured to, or operable to support a means for performing a CFRA procedure. The communications manager 520 is capable of, configured to, or operable to support a means for receiving, from a second network entity, configuration information for the CFRA procedure, where the configuration information includes one or more resources available for transmission of a first uplink message and of a second uplink message, where the one or more resources are each associated with a first waveform type, and where the second uplink message is configured to be responsive to a random access response message triggered by the first uplink message. The communications manager 520 is capable of, configured to, or operable to support a means for transmitting, to the second network entity, the first uplink message via the one or more resources and via a first waveform that is of the first waveform type associated with the one or more resources. The communications manager 520 is capable of, configured to, or operable to support a means for monitoring, responsive to the first uplink message, for the random access response message. The communications manager 520 is capable of, configured to, or operable to support a means for refraining from transmitting, to the second network entity, the second uplink message based on failure to receive the random access response message.

By including or configuring the communications manager 520 in accordance with examples as described herein, the device 505 (e.g., at least one processor controlling or otherwise coupled with the receiver 510, the transmitter 515, the communications manager 520, or a combination thereof) may support techniques for waveform reuse for CFRA procedures, which may result in reduced processing, reduced power consumption, and more efficient utilization of communication resources.

Figure 6:
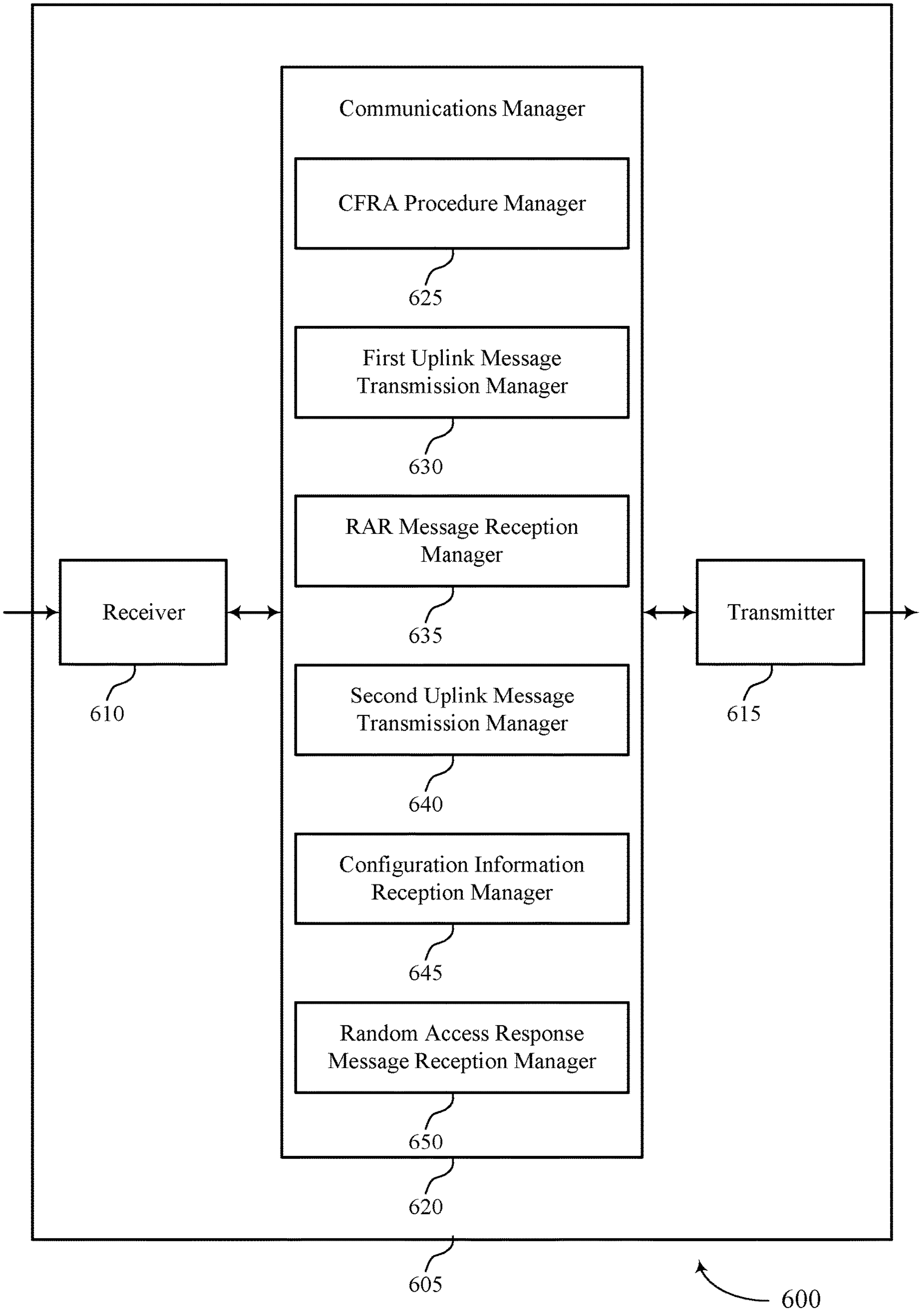

FIG. 6 shows a block diagram 600 of a device 605 that supports reusing waveform types for CFRA procedures in accordance with one or more aspects of the present disclosure. The device 605 may be an example of aspects of a device 505 or a UE 115 as described herein. The device 605 may include a receiver 610, a transmitter 615, and a communications manager 620. The device 605, or one or more components of the device 605 (e.g., the receiver 610, the transmitter 615, and the communications manager 620), may include at least one processor, which may be coupled with at least one memory, to support the described techniques. Each of these components may be in communication with one another (e.g., via one or more buses).

The receiver 610 may provide a means for receiving information such as packets, user data, control information, or any combination thereof associated with various information channels (e.g., control channels, data channels, information channels related to reusing waveform types for CFRA procedures). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to reusing waveform types for CFRA procedures). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of reusing waveform types for CFRA procedures as described herein. For example, the communications manager 620 may include a CFRA procedure manager 625, a first uplink message transmission manager 630, a RAR message reception manager 635, a second uplink message transmission manager 640, a configuration information reception manager 645, a random access response message reception manager 650, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication in accordance with examples as disclosed herein. The CFRA procedure manager 625 is capable of, configured to, or operable to support a means for performing a CFRA procedure. The first uplink message transmission manager 630 is capable of, configured to, or operable to support a means for transmitting, to a second network entity, a first uplink message via a first resource associated with a first resource index and via a first waveform type. The RAR message reception manager 635 is capable of, configured to, or operable to support a means for receiving, from the second network entity and in response to the first uplink message, a random access response message. The second uplink message transmission manager 640 is capable of, configured to, or operable to support a means for transmitting, to the second network entity and in response to the random access response message, a second uplink message via a second resource associated with the first resource index and via the first waveform type.

Additionally, or alternatively, the communications manager 620 may support wireless communication in accordance with examples as disclosed herein. The CFRA procedure manager 625 is capable of, configured to, or operable to support a means for performing a CFRA procedure. The configuration information reception manager 645 is capable of, configured to, or operable to support a means for receiving, from a second network entity, configuration information for the CFRA procedure, where the configuration information includes one or more resources available for transmission of a first uplink message and of a second uplink message, where the one or more resources are each associated with a first waveform type, and where the second uplink message is configured to be responsive to a random access response message triggered by the first uplink message. The first uplink message transmission manager 630 is capable of, configured to, or operable to support a means for transmitting, to the second network entity, the first uplink message via the one or more resources and via a first waveform that is of the first waveform type associated with the one or more resources. The random access response message reception manager 650 is capable of, configured to, or operable to support a means for monitoring, responsive to the first uplink message, for the random access response message. The second uplink message transmission manager 640 is capable of, configured to, or operable to support a means for refraining from transmitting, to the second network entity, the second uplink message based on failure to receive the random access response message.

Figure 7:
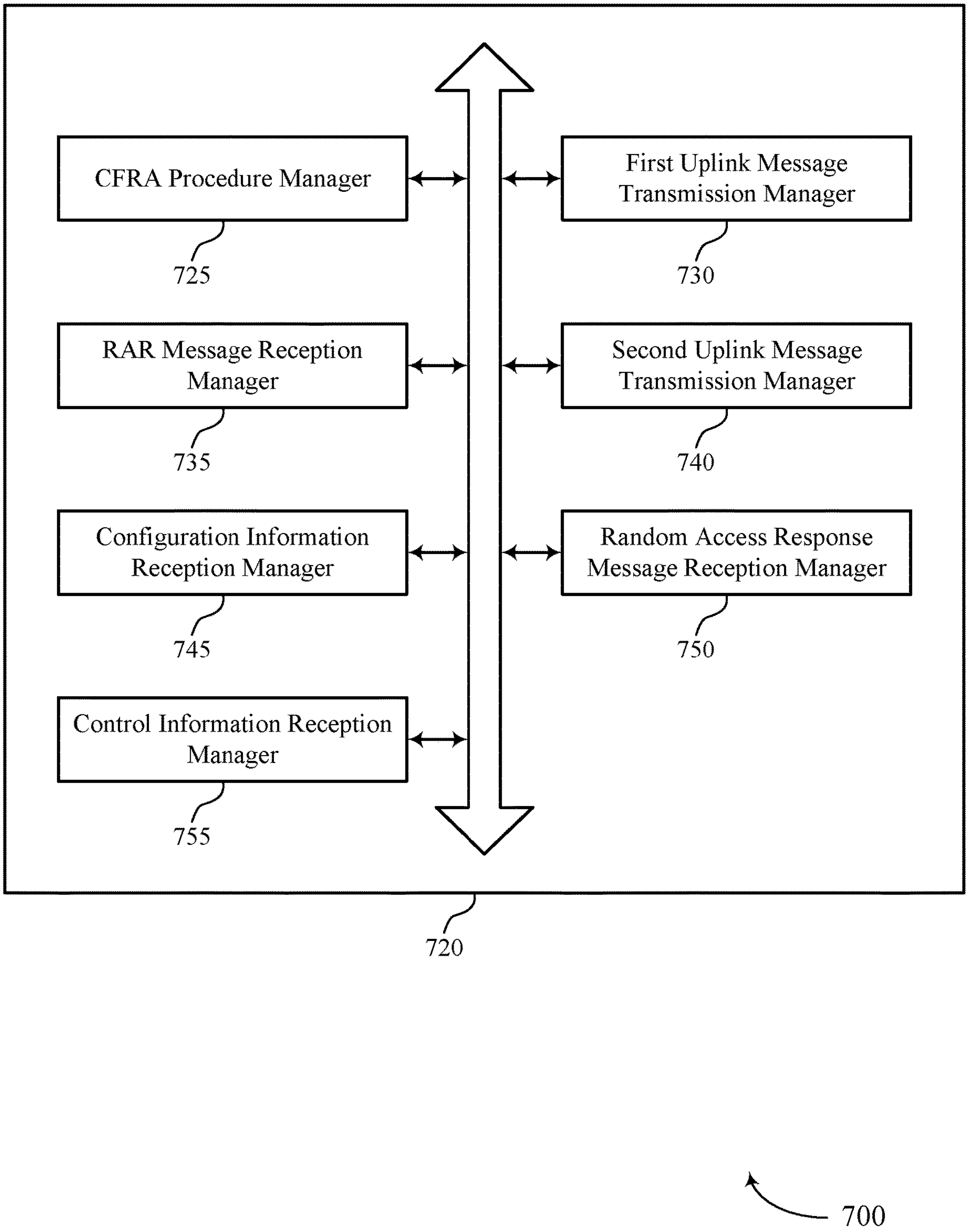
FIG. 7 shows a block diagram of a communications manager that supports reusing waveform types for CFRA procedures in accordance with one or more aspects of the present disclosure.

FIG. 7 shows a block diagram 700 of a communications manager 720 that supports reusing waveform types for CFRA procedures in accordance with one or more aspects of the present disclosure. The communications manager 720 may be an example of aspects of a communications manager 520, a communications manager 620, or both, as described herein. The communications manager 720, or various components thereof, may be an example of means for performing various aspects of reusing waveform types for CFRA procedures as described herein. For example, the communications manager 720 may include a CFRA procedure manager 725, a first uplink message transmission manager 730, a RAR message reception manager 735, a second uplink message transmission manager 740, a configuration information reception manager 745, a random access response message reception manager 750, a control information reception manager 755, or any combination thereof. Each of these components, or components or subcomponents thereof (e.g., one or more processors, one or more memories), may communicate, directly or indirectly, with one another (e.g., via one or more buses).

The communications manager 720 may support wireless communication in accordance with examples as disclosed herein. The CFRA procedure manager 725 is capable of, configured to, or operable to support a means for performing a CFRA procedure. The first uplink message transmission manager 730 is capable of, configured to, or operable to support a means for transmitting, to a second network entity, a first uplink message via a first resource associated with a first resource index and via a first waveform type. The RAR message reception manager 735 is capable of, configured to, or operable to support a means for receiving, from the second network entity and in response to the first uplink message, a random access response message. The second uplink message transmission manager 740 is capable of, configured to, or operable to support a means for transmitting, to the second network entity and in response to the random access response message, a second uplink message via a second resource associated with the first resource index and via the first waveform type.

In some examples, to support performing the CFRA procedure, the control information reception manager 755 is capable of, configured to, or operable to support a means for receiving, from the second network entity, control information that includes one or more of an indication of the first waveform type, a first time duration for monitoring a physical downlink control channel for the random access response message after transmission of the first uplink message, or a second time duration during which resources are available for uplink transmissions during the CFRA procedure, where the first resource and the second resource are valid for uplink messages of the CFRA procedure within the second time duration.

In some examples, the first time duration overlaps with the second time duration. In some examples, the second time duration extends later in time than the first time duration.

In some examples, the first resource and the second resource include physical random access channel occasions and. In some examples, the first waveform type includes a CFRA preamble.

In some examples, the first resource and the second resource include physical uplink control channel occasions and. In some examples, the first waveform type includes a physical uplink control channel waveform.

In some examples, a cyclic prefix associated with the physical uplink control channel waveform is longer than a round trip time associated with communication between the first network entity and the second network entity.

In some examples, to support performing the CFRA procedure, the control information reception manager 755 is capable of, configured to, or operable to support a means for receiving, from the second network entity, a control message that includes an indication of the association between the transmit beam and the downlink reference signal beam.

In some examples, the random access response message includes an indication of a timing advance command for application to subsequent uplink communications from the first network entity to the second network entity. In some examples, transmission of the second uplink message is based on the timing advance command.

In some examples, transmission of the first uplink message is based on a default timing advance command. In some examples, the default timing advance command is zero.

In some examples, the random access response message is a compact random access response message that is received via a physical downlink control channel. In some examples, the compact random access response message does not include resource allocation information associated with one or more physical downlink data channels.

Additionally, or alternatively, the communications manager 720 may support wireless communication in accordance with examples as disclosed herein. In some examples, the CFRA procedure manager 725 is capable of, configured to, or operable to support a means for performing a CFRA procedure. The configuration information reception manager 745 is capable of, configured to, or operable to support a means for receiving, from a second network entity, configuration information for the CFRA procedure, where the configuration information includes one or more resources available for transmission of a first uplink message and of a second uplink message, where the one or more resources are each associated with a first waveform type, and where the second uplink message is configured to be responsive to a random access response message triggered by the first uplink message. In some examples, the first uplink message transmission manager 730 is capable of, configured to, or operable to support a means for transmitting, to the second network entity, the first uplink message via the one or more resources and via a first waveform that is of the first waveform type associated with the one or more resources. The random access response message reception manager 750 is capable of, configured to, or operable to support a means for monitoring, responsive to the first uplink message, for the random access response message. In some examples, the second uplink message transmission manager 740 is capable of, configured to, or operable to support a means for refraining from transmitting, to the second network entity, the second uplink message based on failure to receive the random access response message.

In some examples, non-transmission of the second uplink message is indicative of the failure of the first network entity to receive the random access response message.

In some examples, to support performing the CFRA procedure, the control information reception manager 755 is capable of, configured to, or operable to support a means for receiving, from the second network entity, control information that includes one or more of an indication of the first waveform type, a first time duration for monitoring a physical downlink control channel for the random access response message after transmission of the first uplink message, or a second time duration during which resources are available for uplink transmissions during the CFRA procedure, where the first resource and the second resource are valid for uplink messages of the CFRA procedure within the second time duration.

In some examples, the first time duration overlaps with the second time duration. In some examples, the second time duration extends later in time than the first time duration.

In some examples, the one or more resources include physical random access channel occasions and. In some examples, the first waveform type includes a CFRA preamble.

In some examples, the one or more resources include physical uplink control channel occasions and. In some examples, the first waveform type includes a physical uplink control channel waveform.

In some examples, the random access response message includes an indication of a timing advance command for application to communications from the first network entity to the second network entity.

In some examples, the random access response message is a compact random access response message that is received via a physical downlink control channel. In some examples, the compact random access response message does not include resource allocation information associated with one or more physical downlink data channels.

Figure 8:
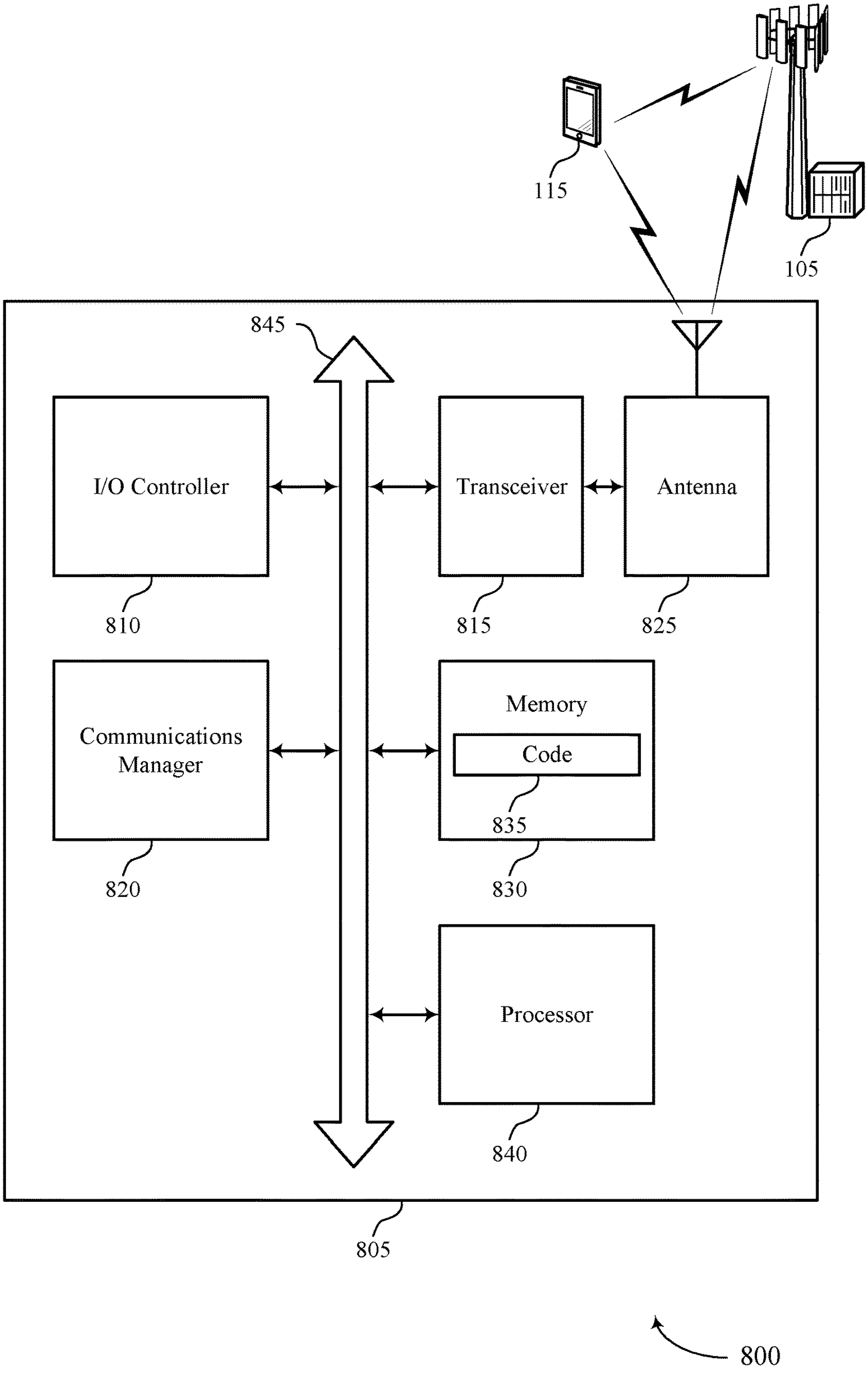
FIG. 8 shows a diagram of a system including a device that supports reusing waveform types for CFRA procedures in accordance with one or more aspects of the present disclosure.

FIG. 8 shows a diagram of a system 800 including a device 805 that supports reusing waveform types for CFRA procedures in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, at least one memory 830, code 835, and at least one processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of one or more processors, such as the at least one processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The at least one memory 830 may include random access memory (RAM) and read-only memory (ROM). The at least one memory 830 may store computer-readable, computer-executable code 835 including instructions that, when executed by the at least one processor 840, cause the device 805 to perform various functions described herein. The code 835 may be stored in a non-transitory computer-readable medium such as system memory or another type of memory. In some cases, the code 835 may not be directly executable by the at least one processor 840 but may cause a computer (e.g., when compiled and executed) to perform functions described herein. In some cases, the at least one memory 830 may contain, among other things, a basic I/O system (BIOS) which may control basic hardware or software operation such as the interaction with peripheral components or devices.

The at least one processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 840 may be configured to operate a memory array using a memory controller. In some other cases, a memory controller may be integrated into the at least one processor 840. The at least one processor 840 may be configured to execute computer-readable instructions stored in a memory (e.g., the at least one memory 830) to cause the device 805 to perform various functions (e.g., functions or tasks supporting reusing waveform types for CFRA procedures). For example, the device 805 or a component of the device 805 may include at least one processor 840 and at least one memory 830 coupled with or to the at least one processor 840, the at least one processor 840 and at least one memory 830 configured to perform various functions described herein. In some examples, the at least one processor 840 may include multiple processors and the at least one memory 830 may include multiple memories. One or more of the multiple processors may be coupled with one or more of the multiple memories, which may, individually or collectively, be configured to perform various functions herein. In some examples, the at least one processor 840 may be a component of a processing system, which may refer to a system (such as a series) of machines, circuitry (including, for example, one or both of processor circuitry (which may include the at least one processor 840) and memory circuitry (which may include the at least one memory 830)), or components, that receives or obtains inputs and processes the inputs to produce, generate, or obtain a set of outputs. The processing system may be configured to perform one or more of the functions described herein. As such, the at least one processor 840 or a processing system including the at least one processor 840 may be configured to, configurable to, or operable to cause the device 805 to perform one or more of the functions described herein. Further, as described herein, being "configured to," being "configurable to," and being "operable to" may be used interchangeably and may be associated with a capability, when executing code stored in the at least one memory 830 or otherwise, to perform one or more of the functions described herein.

The communications manager 820 may support wireless communication in accordance with examples as disclosed herein. For example, the communications manager 820 is capable of, configured to, or operable to support a means for performing a CFRA procedure. The communications manager 820 is capable of, configured to, or operable to support a means for transmitting, to a second network entity, a first uplink message via a first resource associated with a first resource index and via a first waveform type. The communications manager 820 is capable of, configured to, or operable to support a means for receiving, from the second network entity and in response to the first uplink message, a random access response message. The communications manager 820 is capable of, configured to, or operable to support a means for transmitting, to the second network entity and in response to the random access response message, a second uplink message via a second resource associated with the first resource index and via the first waveform type.

Additionally, or alternatively, the communications manager 820 may support wireless communication in accordance with examples as disclosed herein. For example, the communications manager 820 is capable of, configured to, or operable to support a means for performing a CFRA procedure. The communications manager 820 is capable of, configured to, or operable to support a means for receiving, from a second network entity, configuration information for the CFRA procedure, where the configuration information includes one or more resources available for transmission of a first uplink message and of a second uplink message, where the one or more resources are each associated with a first waveform type, and where the second uplink message is configured to be responsive to a random access response message triggered by the first uplink message. The communications manager 820 is capable of, configured to, or operable to support a means for transmitting, to the second network entity, the first uplink message via the one or more resources and via a first waveform that is of the first waveform type associated with the one or more resources. The communications manager 820 is capable of, configured to, or operable to support a means for monitoring, responsive to the first uplink message, for the random access response message. The communications manager 820 is capable of, configured to, or operable to support a means for refraining from transmitting, to the second network entity, the second uplink message based on failure to receive the random access response message.

By including or configuring the communications manager 820 in accordance with examples as described herein, the device 805 may support techniques for waveform reuse for CFRA procedures, which may result in reduced latency, improved user experience related to reduced processing, reduced power consumption, more efficient utilization of communication resources, and improved utilization of processing capability.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the at least one processor 840, the at least one memory 830, the code 835, or any combination thereof. For example, the code 835 may include instructions executable by the at least one processor 840 to cause the device 805 to perform various aspects of reusing waveform types for CFRA procedures as described herein, or the at least one processor 840 and the at least one memory 830 may be otherwise configured to, individually or collectively, perform or support such operations.

Figure 9:
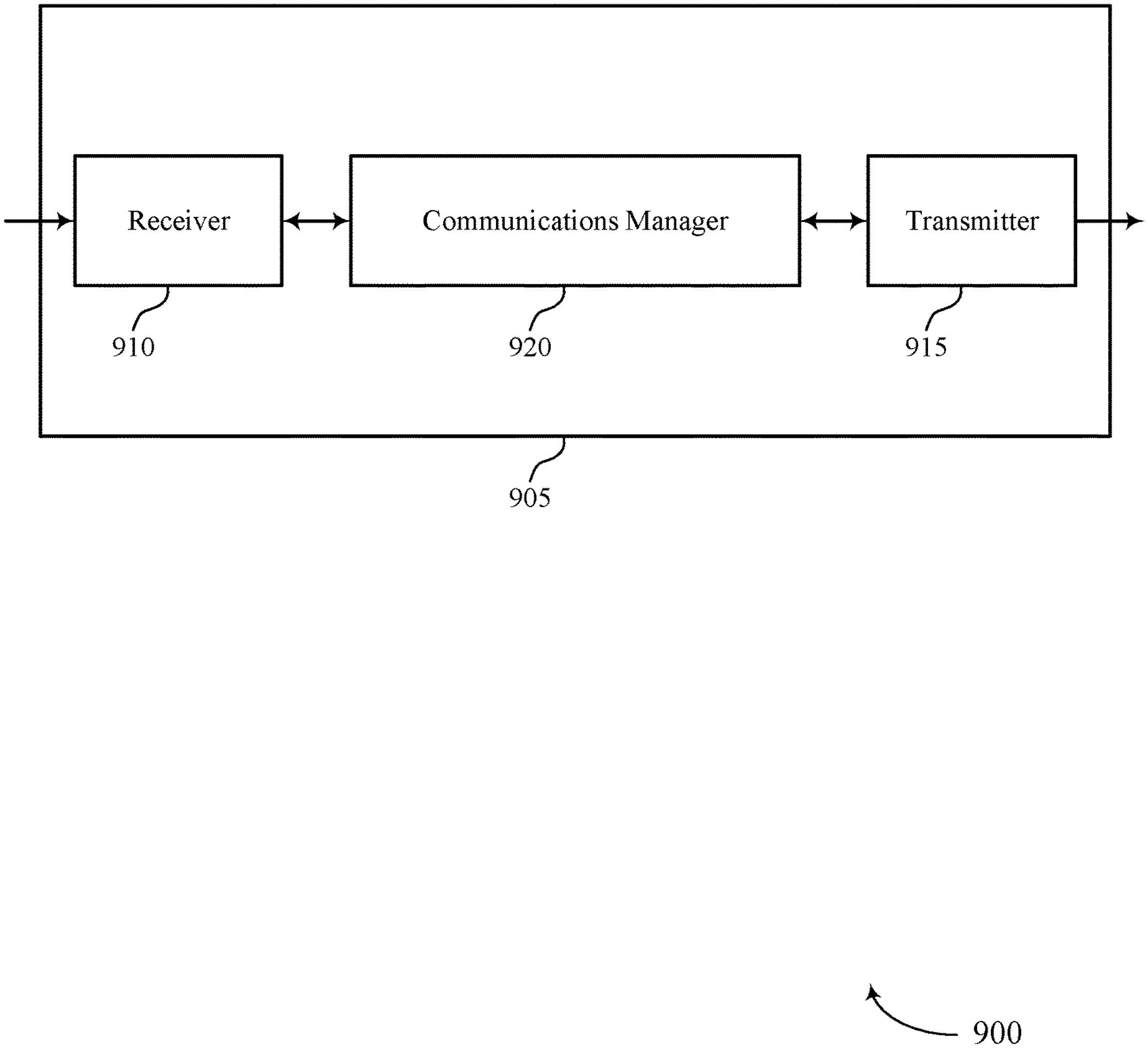
FIGS. 9 and 10 show block diagrams of devices that support reusing waveform types for CFRA procedures in accordance with one or more aspects of the present disclosure.

FIG. 9 shows a block diagram 900 of a device 905 that supports reusing waveform types for CFRA procedures in accordance with one or more aspects of the present disclosure. The device 905 may be an example of aspects of a network entity 105 as described herein. The device 905 may include a receiver 910, a transmitter 915, and a communications manager 920. The device 905, or one or more components of the device 905 (e.g., the receiver 910, the transmitter 915, and the communications manager 920), may include at least one processor, which may be coupled with at least one memory, to, individually or collectively, support or enable the described techniques. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of reusing waveform types for CFRA procedures as described herein. For example, the communications manager 920, the receiver 910, the transmitter 915, or various combinations or components thereof may be capable of performing one or more of the functions described herein.

In some examples, the communications manager 920, the receiver 910, the transmitter 915, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 920, the receiver 910, the transmitter 915, or various combinations or components thereof may be implemented in code (e.g., as communications management software or firmware) executed by at least one processor. If implemented in code executed by at least one processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication in accordance with examples as disclosed herein. For example, the communications manager 920 is capable of, configured to, or operable to support a means for performing a CFRA procedure. The communications manager 920 is capable of, configured to, or operable to support a means for receiving, from a second network entity, a first uplink message via a first resource associated with a first resource index and via a first waveform type. The communications manager 920 is capable of, configured to, or operable to support a means for transmitting, to the second network entity and in response to the first uplink message, a random access response message. The communications manager 920 is capable of, configured to, or operable to support a means for receiving, from the second network entity and in response to the random access response message, a second uplink message via a second resource associated with the first resource index and via the first waveform type.

Additionally, or alternatively, the communications manager 920 may support wireless communications in accordance with examples as disclosed herein. For example, the communications manager 920 is capable of, configured to, or operable to support a means for performing a CFRA procedure. The communications manager 920 is capable of, configured to, or operable to support a means for transmitting, to a second network entity, configuration information for the CFRA procedure, where the configuration information includes one or more resources available for transmission by the second network entity of a first uplink message and of a second uplink message, where the one or more resources are each associated with a first waveform type, and where the second uplink message is configured to be responsive to a random access response message triggered by the first uplink message. The communications manager 920 is capable of, configured to, or operable to support a means for receiving, from the second network entity, the first uplink message via the one or more resources and via a first waveform that is of the first waveform type associated with the one or more resources. The communications manager 920 is capable of, configured to, or operable to support a means for transmitting, to the second network entity and responsive to the first uplink message, the random access response message. The communications manager 920 is capable of, configured to, or operable to support a means for monitoring, responsive to the random access response message, for the second uplink message. The communications manager 920 is capable of, configured to, or operable to support a means for determining that absence of a reception of the second uplink message is indicative of a failure of the second network entity to receive the random access response message.

By including or configuring the communications manager 920 in accordance with examples as described herein, the device 905 (e.g., at least one processor controlling or otherwise coupled with the receiver 910, the transmitter 915, the communications manager 920, or a combination thereof) may support techniques for waveform reuse for CFRA procedures, which may result reduced processing, reduced power consumption, and more efficient utilization of communication resources.

Figure 10:
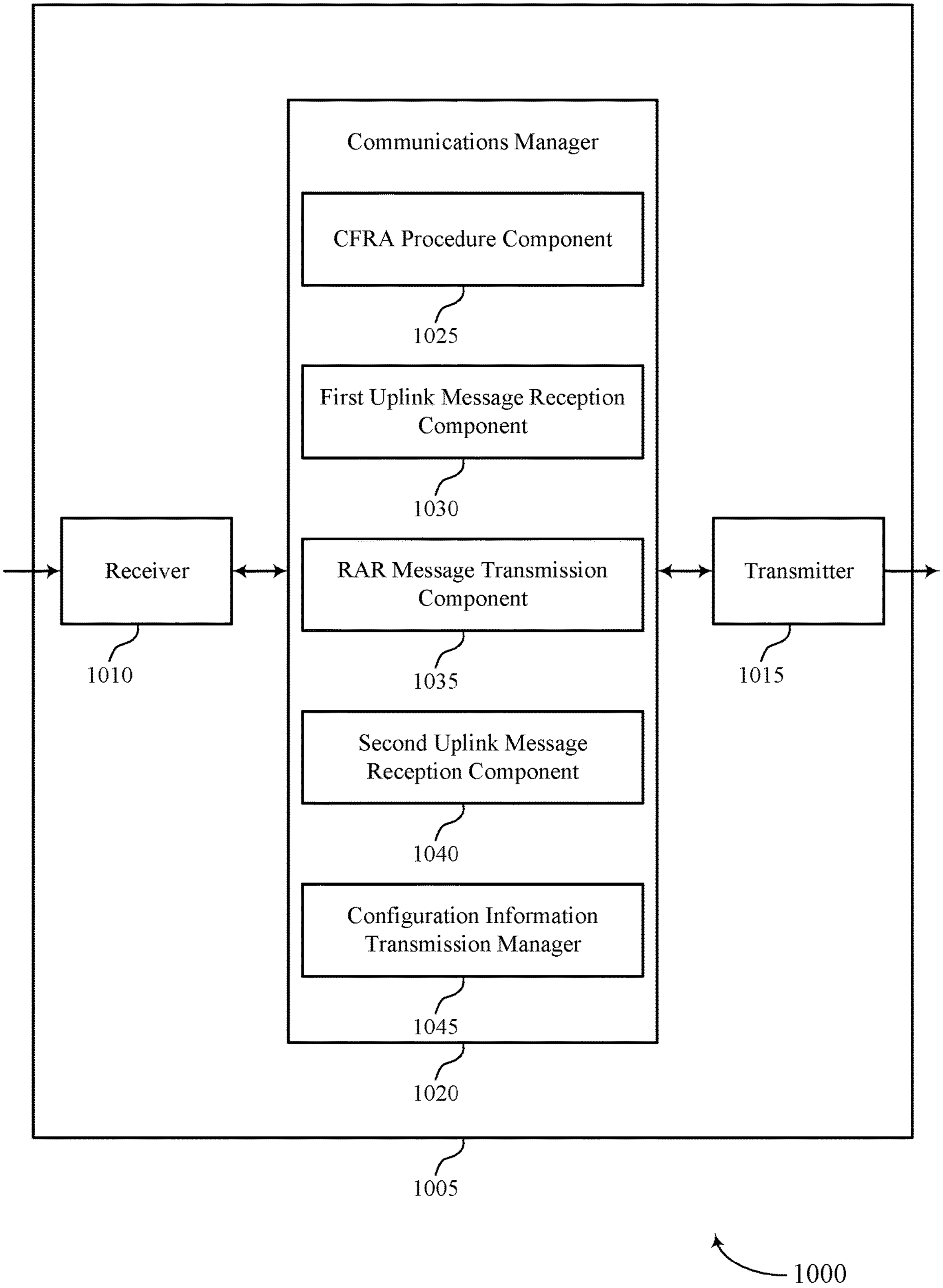

FIG. 10 shows a block diagram 1000 of a device 1005 that supports reusing waveform types for CFRA procedures in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005, or one or more components of the device 1005 (e.g., the receiver 1010, the transmitter 1015, and the communications manager 1020), may include at least one processor, which may be coupled with at least one memory, to support the described techniques. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of reusing waveform types for CFRA procedures as described herein. For example, the communications manager 1020 may include a CFRA procedure component 1025, a first uplink message reception component 1030, a RAR message transmission component 1035, a second uplink message reception component 1040, a configuration information transmission manager 1045, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication in accordance with examples as disclosed herein. The CFRA procedure component 1025 is capable of, configured to, or operable to support a means for performing a CFRA procedure. The first uplink message reception component 1030 is capable of, configured to, or operable to support a means for receiving, from a second network entity, a first uplink message via a first resource associated with a first resource index and via a first waveform type. The RAR message transmission component 1035 is capable of, configured to, or operable to support a means for transmitting, to the second network entity and in response to the first uplink message, a random access response message. The second uplink message reception component 1040 is capable of, configured to, or operable to support a means for receiving, from the second network entity and in response to the random access response message, a second uplink message via a second resource associated with the first resource index and via the first waveform type.

Additionally, or alternatively, the communications manager 1020 may support wireless communications in accordance with examples as disclosed herein. The CFRA procedure component 1025 is capable of, configured to, or operable to support a means for performing a CFRA procedure. The configuration information transmission manager 1045 is capable of, configured to, or operable to support a means for transmitting, to a second network entity, configuration information for the CFRA procedure, where the configuration information includes one or more resources available for transmission by the second network entity of a first uplink message and of a second uplink message, where the one or more resources are each associated with a first waveform type, and where the second uplink message is configured to be responsive to a random access response message triggered by the first uplink message. The first uplink message reception component 1030 is capable of, configured to, or operable to support a means for receiving, from the second network entity, the first uplink message via the one or more resources and via a first waveform that is of the first waveform type associated with the one or more resources. The RAR message transmission component 1035 is capable of, configured to, or operable to support a means for transmitting, to the second network entity and responsive to the first uplink message, the random access response message. The second uplink message reception component 1040 is capable of, configured to, or operable to support a means for monitoring, responsive to the random access response message, for the second uplink message. The second uplink message reception component 1040 is capable of, configured to, or operable to support a means for determining that absence of a reception of the second uplink message is indicative of a failure of the second network entity to receive the random access response message.

Figure 11:
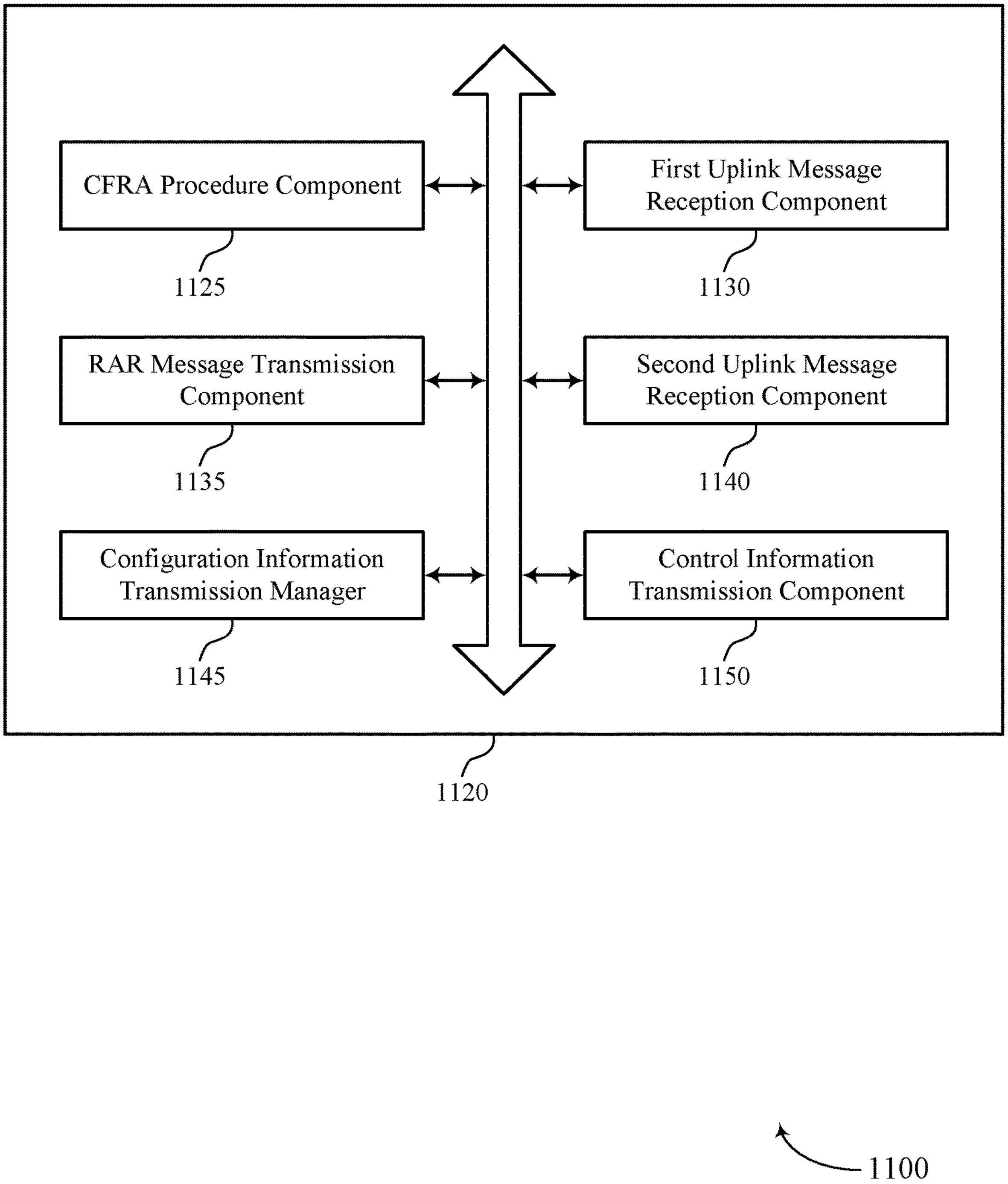
FIG. 11 shows a block diagram of a communications manager that supports reusing waveform types for CFRA procedures in accordance with one or more aspects of the present disclosure.

FIG. 11 shows a block diagram 1100 of a communications manager 1120 that supports reusing waveform types for CFRA procedures in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of reusing waveform types for CFRA procedures as described herein. For example, the communications manager 1120 may include a CFRA procedure component 1125, a first uplink message reception component 1130, a RAR message transmission component 1135, a second uplink message reception component 1140, a configuration information transmission manager 1145, a control information transmission component 1150, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communication in accordance with examples as disclosed herein. The CFRA procedure component 1125 is capable of, configured to, or operable to support a means for performing a CFRA procedure. The first uplink message reception component 1130 is capable of, configured to, or operable to support a means for receiving, from a second network entity, a first uplink message via a first resource associated with a first resource index and via a first waveform type. The RAR message transmission component 1135 is capable of, configured to, or operable to support a means for transmitting, to the second network entity and in response to the first uplink message, a random access response message. The second uplink message reception component 1140 is capable of, configured to, or operable to support a means for receiving, from the second network entity and in response to the random access response message, a second uplink message via a second resource associated with the first resource index and via the first waveform type.

In some examples, to support performing the CFRA procedure, the control information transmission component 1150 is capable of, configured to, or operable to support a means for transmitting, to the second network entity, control information that includes one or more of an indication of the first waveform type, a first time duration for monitoring a physical downlink control channel for the random access response message after transmission of the first uplink message, or a second time duration during which resources are available for uplink transmissions during the CFRA procedure, where the first resource and the second resource are valid for uplink messages of the CFRA procedure within the second time duration.

In some examples, the first time duration overlaps with the second time duration. In some examples, the second time duration extends later in time than the first time duration.

In some examples, the first resource and the second resource include physical uplink control channel occasions and. In some examples, the first waveform type includes a physical uplink control channel waveform.

In some examples, a cyclic prefix associated with the physical uplink control channel waveform is longer than a round trip time associated with communication between the first network entity and the second network entity.

In some examples, to support performing the CFRA procedure, the control information transmission component 1150 is capable of, configured to, or operable to support a means for transmitting, to the second network entity, a control message that includes an indication of the association between the transmit beam and the downlink reference signal beam.

In some examples, the random access response message includes an indication of a timing advance command for application to communications from the second network entity to the first network entity.

In some examples, the random access response message is a compact random access response message that is received via a physical downlink control channel. In some examples, the compact random access response message does not include resource allocation information associated with one or more physical downlink data channels.

Additionally, or alternatively, the communications manager 1120 may support wireless communications in accordance with examples as disclosed herein. In some examples, the CFRA procedure component 1125 is capable of, configured to, or operable to support a means for performing a CFRA procedure. The configuration information transmission manager 1145 is capable of, configured to, or operable to support a means for transmitting, to a second network entity, configuration information for the CFRA procedure, where the configuration information includes one or more resources available for transmission by the second network entity of a first uplink message and of a second uplink message, where the one or more resources are each associated with a first waveform type, and where the second uplink message is configured to be responsive to a random access response message triggered by the first uplink message. In some examples, the first uplink message reception component 1130 is capable of, configured to, or operable to support a means for receiving, from the second network entity, the first uplink message via the one or more resources and via a first waveform that is of the first waveform type associated with the one or more resources. In some examples, the RAR message transmission component 1135 is capable of, configured to, or operable to support a means for transmitting, to the second network entity and responsive to the first uplink message, the random access response message. In some examples, the second uplink message reception component 1140 is capable of, configured to, or operable to support a means for monitoring, responsive to the random access response message, for the second uplink message. In some examples, the second uplink message reception component 1140 is capable of, configured to, or operable to support a means for determining that absence of a reception of the second uplink message is indicative of a failure of the second network entity to receive the random access response message.

In some examples, to support performing the CFRA procedure, the control information transmission component 1150 is capable of, configured to, or operable to support a means for transmitting, to the second network entity, control information that includes one or more of an indication of the first waveform type, a first time duration for monitoring a physical downlink control channel for the random access response message after transmission of the first uplink message, or a second time duration during which resources are available for uplink transmissions during the CFRA procedure, where the first resource and the second resource are valid for uplink messages of the CFRA procedure within the second time duration.

In some examples, the first time duration overlaps with the second time duration. In some examples, the second time duration extends later in time than the first time duration.

In some examples, the one or more resources include physical random access channel occasions and. In some examples, the first waveform type includes a CFRA preamble.

In some examples, the one or more resources include physical uplink control channel occasions and. In some examples, the first waveform type includes a physical uplink control channel waveform.

In some examples, the random access response message includes an indication of a timing advance command for application to communications from the second network entity to the first network entity.

In some examples, a default timing advance command for the first uplink message is zero.

In some examples, the random access response message is a compact random access response message that is received via a physical downlink control channel. In some examples, the compact random access response message does not include resource allocation information associated with one or more physical downlink data channels.

Figure 12:
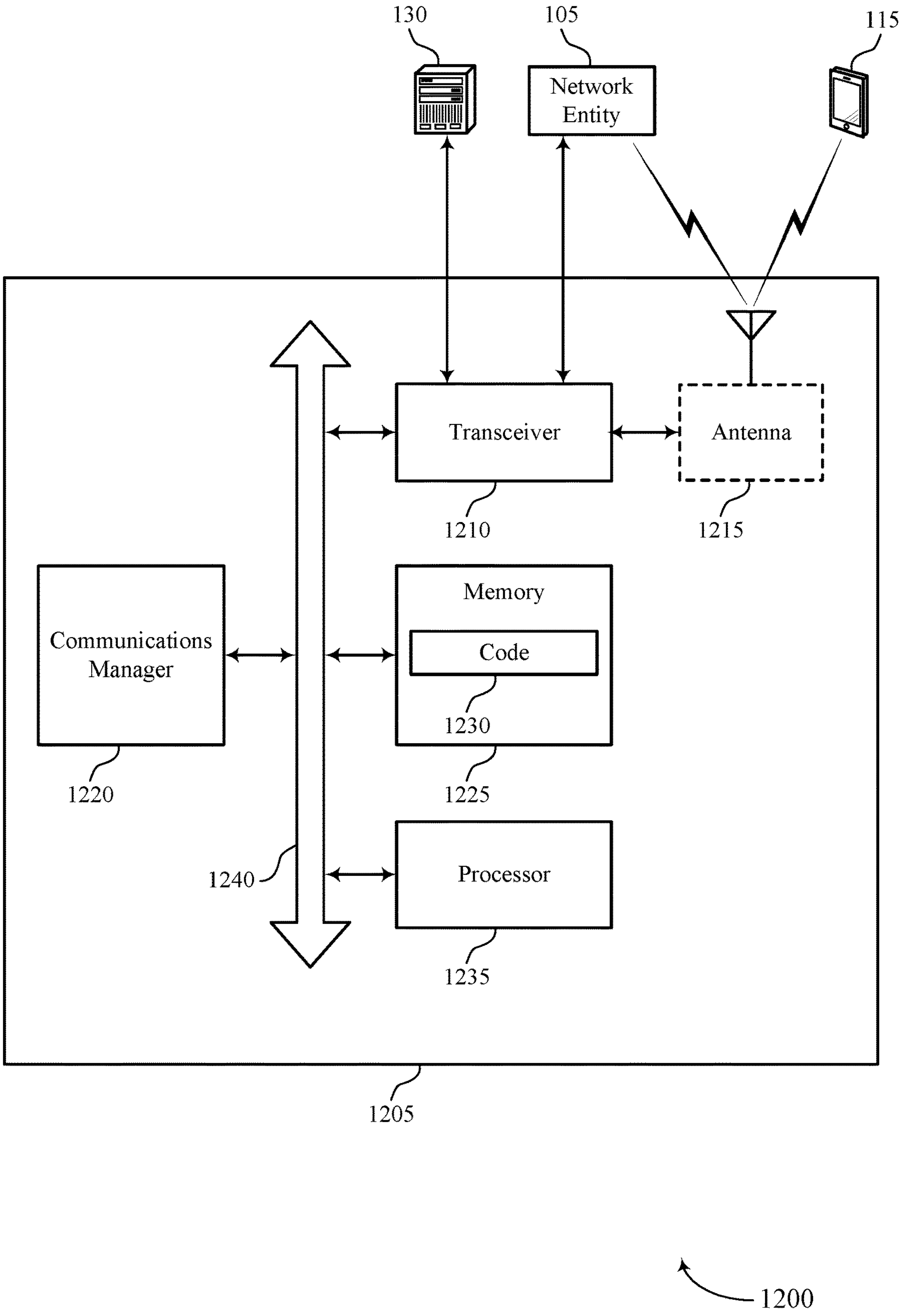
FIG. 12 shows a diagram of a system including a device that supports reusing waveform types for CFRA procedures in accordance with one or more aspects of the present disclosure.

FIG. 12 shows a diagram of a system 1200 including a device 1205 that supports reusing waveform types for CFRA procedures in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, at least one memory 1225, code 1230, and at least one processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or one or more memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or one or more memory components (e.g., the at least one processor 1235, the at least one memory 1225, or both), may be included in a chip or chip assembly that is installed in the device 1205. In some examples, the transceiver 1210 may be operable to support communications via one or more communications links (e.g., a communication link 125, a backhaul communication link 120, a midhaul communication link 162, a fronthaul communication link 168).

The at least one memory 1225 may include RAM, ROM, or any combination thereof. The at least one memory 1225 may store computer-readable, computer-executable code 1230 including instructions that, when executed by one or more of the at least one processor 1235, cause the device 1205 to perform various functions described herein. The code 1230 may be stored in a non-transitory computer-readable medium such as system memory or another type of memory. In some cases, the code 1230 may not be directly executable by a processor of the at least one processor 1235 but may cause a computer (e.g., when compiled and executed) to perform functions described herein. In some cases, the at least one memory 1225 may contain, among other things, a BIOS which may control basic hardware or software operation such as the interaction with peripheral components or devices. In some examples, the at least one processor 1235 may include multiple processors and the at least one memory 1225 may include multiple memories. One or more of the multiple processors may be coupled with one or more of the multiple memories which may, individually or collectively, be configured to perform various functions herein (for example, as part of a processing system).

The at least one processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 1235 may be configured to operate a memory array using a memory controller. In some other cases, a memory controller may be integrated into one or more of the at least one processor 1235. The at least one processor 1235 may be configured to execute computer-readable instructions stored in a memory (e.g., one or more of the at least one memory 1225) to cause the device 1205 to perform various functions (e.g., functions or tasks supporting reusing waveform types for CFRA procedures). For example, the device 1205 or a component of the device 1205 may include at least one processor 1235 and at least one memory 1225 coupled with one or more of the at least one processor 1235, the at least one processor 1235 and the at least one memory 1225 configured to perform various functions described herein. The at least one processor 1235 may be an example of a cloud-computing platform (e.g., one or more physical nodes and supporting software such as operating systems, virtual machines, or container instances) that may host the functions (e.g., by executing code 1230) to perform the functions of the device 1205. The at least one processor 1235 may be any one or more suitable processors capable of executing scripts or instructions of one or more software programs stored in the device 1205 (such as within one or more of the at least one memory 1225). In some examples, the at least one processor 1235 may include multiple processors and the at least one memory 1225 may include multiple memories. One or more of the multiple processors may be coupled with one or more of the multiple memories, which may, individually or collectively, be configured to perform various functions herein. In some examples, the at least one processor 1235 may be a component of a processing system, which may refer to a system (such as a series) of machines, circuitry (including, for example, one or both of processor circuitry (which may include the at least one processor 1235) and memory circuitry (which may include the at least one memory 1225)), or components, that receives or obtains inputs and processes the inputs to produce, generate, or obtain a set of outputs. The processing system may be configured to perform one or more of the functions described herein. As such, the at least one processor 1235 or a processing system including the at least one processor 1235 may be configured to, configurable to, or operable to cause the device 1205 to perform one or more of the functions described herein. Further, as described herein, being "configured to," being "configurable to," and being "operable to" may be used interchangeably and may be associated with a capability, when executing code stored in the at least one memory 1225 or otherwise, to perform one or more of the functions described herein.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the at least one memory 1225, the code 1230, and the at least one processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communication in accordance with examples as disclosed herein. For example, the communications manager 1220 is capable of, configured to, or operable to support a means for performing a CFRA procedure. The communications manager 1220 is capable of, configured to, or operable to support a means for receiving, from a second network entity, a first uplink message via a first resource associated with a first resource index and via a first waveform type. The communications manager 1220 is capable of, configured to, or operable to support a means for transmitting, to the second network entity and in response to the first uplink message, a random access response message. The communications manager 1220 is capable of, configured to, or operable to support a means for receiving, from the second network entity and in response to the random access response message, a second uplink message via a second resource associated with the first resource index and via the first waveform type.

Additionally, or alternatively, the communications manager 1220 may support wireless communications in accordance with examples as disclosed herein. For example, the communications manager 1220 is capable of, configured to, or operable to support a means for performing a CFRA procedure. The communications manager 1220 is capable of, configured to, or operable to support a means for transmitting, to a second network entity, configuration information for the CFRA procedure, where the configuration information includes one or more resources available for transmission by the second network entity of a first uplink message and of a second uplink message, where the one or more resources are each associated with a first waveform type, and where the second uplink message is configured to be responsive to a random access response message triggered by the first uplink message. The communications manager 1220 is capable of, configured to, or operable to support a means for receiving, from the second network entity, the first uplink message via the one or more resources and via a first waveform that is of the first waveform type associated with the one or more resources. The communications manager 1220 is capable of, configured to, or operable to support a means for transmitting, to the second network entity and responsive to the first uplink message, the random access response message. The communications manager 1220 is capable of, configured to, or operable to support a means for monitoring, responsive to the random access response message, for the second uplink message. The communications manager 1220 is capable of, configured to, or operable to support a means for determining that absence of a reception of the second uplink message is indicative of a failure of the second network entity to receive the random access response message.

By including or configuring the communications manager 1220 in accordance with examples as described herein, the device 1205 may support techniques for waveform reuse for CFRA procedures, which may result reduced latency, improved user experience related to reduced processing, reduced power consumption, more efficient utilization of communication resources, and improved utilization of processing capability.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the transceiver 1210, one or more of the at least one processor 1235, one or more of the at least one memory 1225, the code 1230, or any combination thereof (for example, by a processing system including at least a portion of the at least one processor 1235, the at least one memory 1225, the code 1230, or any combination thereof). For example, the code 1230 may include instructions executable by one or more of the at least one processor 1235 to cause the device 1205 to perform various aspects of reusing waveform types for CFRA procedures as described herein, or the at least one processor 1235 and the at least one memory 1225 may be otherwise configured to, individually or collectively, perform or support such operations.

Figure 13:
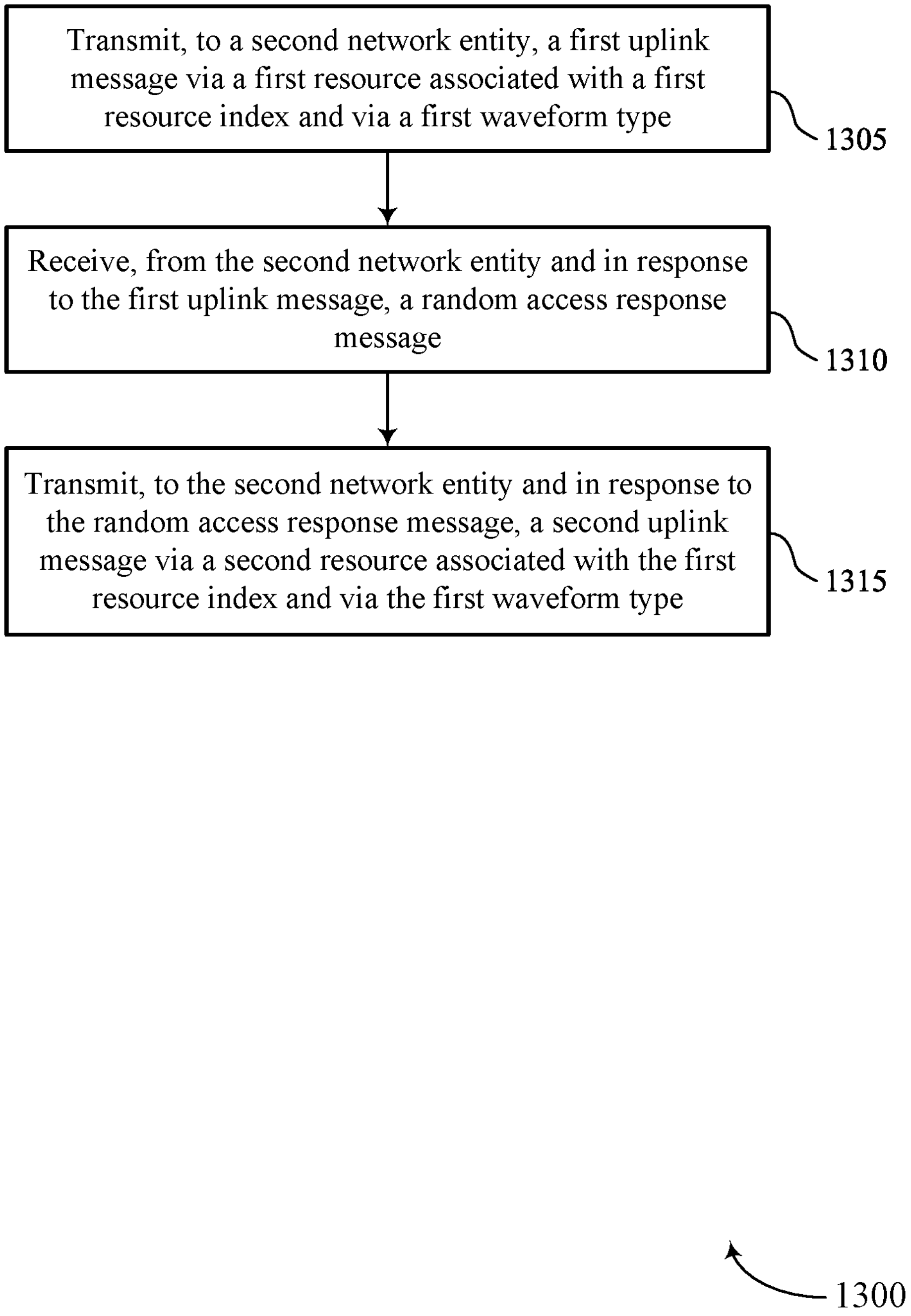
FIGS. 13 through 20 show flowcharts illustrating methods that support reusing waveform types for CFRA procedures in accordance with one or more aspects of the present disclosure.

FIG. 13 shows a flowchart illustrating a method 1300 that supports reusing waveform types for CFRA procedures in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware. The operations of the method 1300 may be performed by a CFRA procedure manager 725 as described with reference to FIG. 7.

At 1305, the method may include transmitting, to a second network entity, a first uplink message via a first resource associated with a first resource index and via a first waveform type. The operations of 1305 may be performed in accordance with examples as disclosed herein. In some examples, aspects of the operations of 1305 may be performed by a first uplink message transmission manager 730 as described with reference to FIG. 7.

At 1310, the method may include receiving, from the second network entity and in response to the first uplink message, a random access response message. The operations of 1310 may be performed in accordance with examples as disclosed herein. In some examples, aspects of the operations of 1310 may be performed by a RAR message reception manager 735 as described with reference to FIG. 7.

At 1315, the method may include transmitting, to the second network entity and in response to the random access response message, a second uplink message via a second resource associated with the first resource index and via the first waveform type. The operations of 1315 may be performed in accordance with examples as disclosed herein. In some examples, aspects of the operations of 1315 may be performed by a second uplink message transmission manager 740 as described with reference to FIG. 7.

Figure 14:
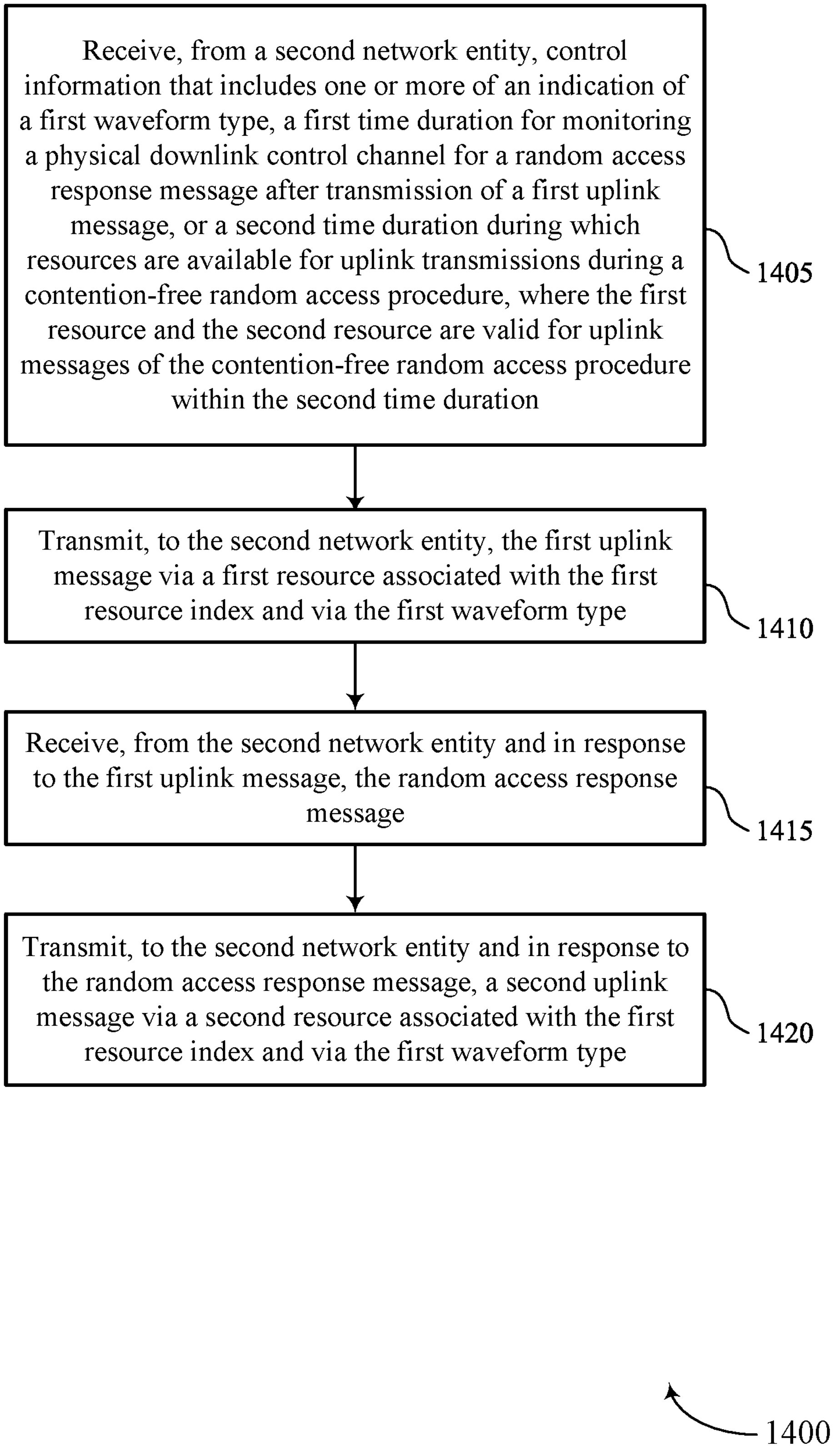

FIG. 14 shows a flowchart illustrating a method 1400 that supports reusing waveform types for CFRA procedures in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware. The operations of the method 1400 may be performed by a CFRA procedure manager 725 as described with reference to FIG. 7.

At 1405, the method may include receiving, from a second network entity, control information that includes one or more of an indication of a first waveform type, a first time duration for monitoring a physical downlink control channel for a random access response message after transmission of a first uplink message, or a second time duration during which resources are available for uplink transmissions during a CFRA procedure, where the first resource and the second resource are valid for uplink messages of the CFRA procedure within the second time duration. The operations of 1405 may be performed in accordance with examples as disclosed herein. In some examples, aspects of the operations of 1405 may be performed by a control information reception manager 755 as described with reference to FIG. 7.

At 1410, the method may include transmitting, to a second network entity, the first uplink message via a first resource associated with the first resource index and via the first waveform type. The operations of 1410 may be performed in accordance with examples as disclosed herein. In some examples, aspects of the operations of 1410 may be performed by a first uplink message transmission manager 730 as described with reference to FIG. 7.

At 1415, the method may include receiving, from the second network entity and in response to the first uplink message, the random access response message. The operations of 1415 may be performed in accordance with examples as disclosed herein. In some examples, aspects of the operations of 1415 may be performed by a RAR message reception manager 735 as described with reference to FIG. 7.

At 1420, the method may include transmitting, to the second network entity and in response to the random access response message, a second uplink message via a second resource associated with the first resource index and via the first waveform type. The operations of 1420 may be performed in accordance with examples as disclosed herein. In some examples, aspects of the operations of 1420 may be performed by a second uplink message transmission manager 740 as described with reference to FIG. 7.

Figure 15:
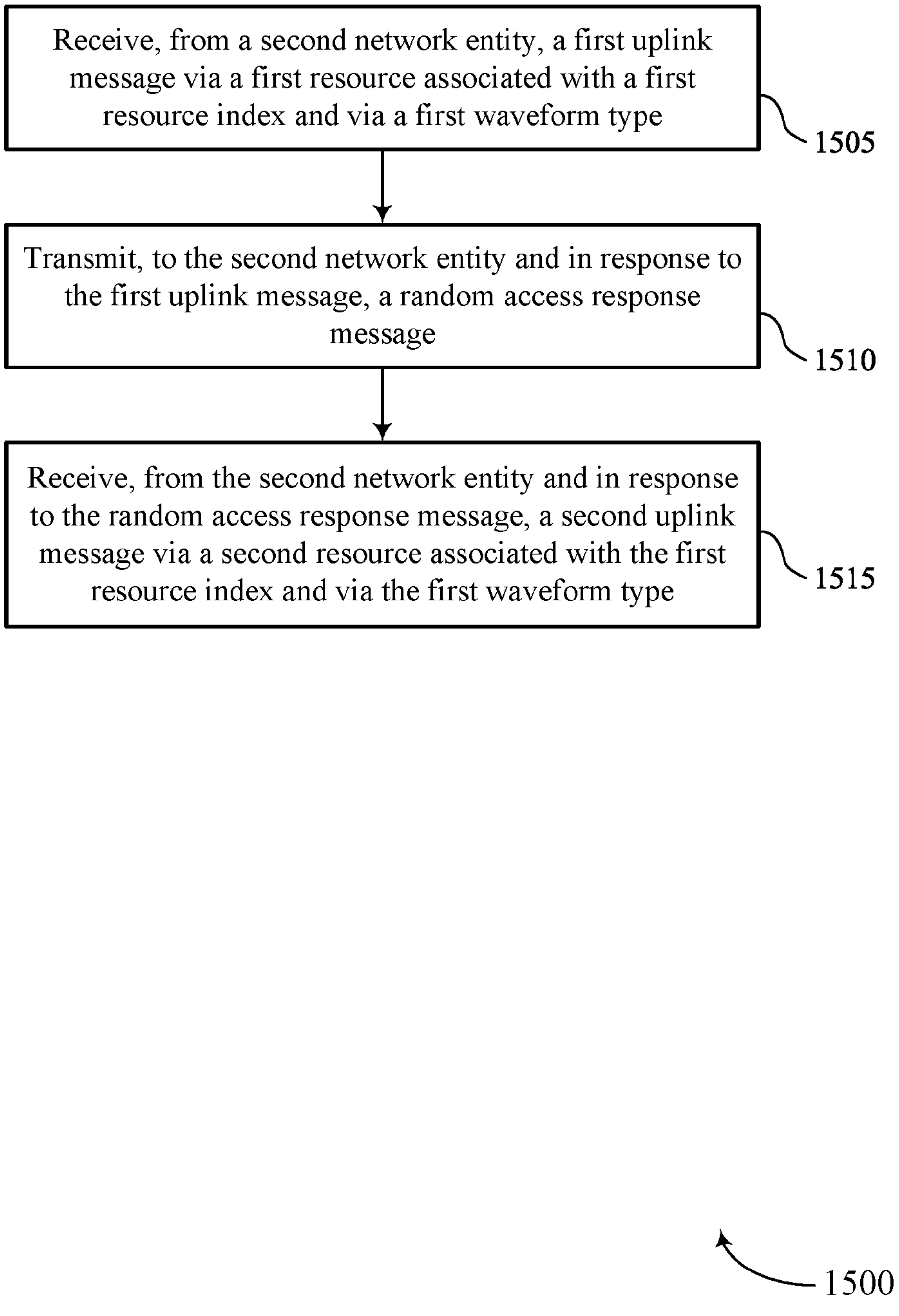

FIG. 15 shows a flowchart illustrating a method 1500 that supports reusing waveform types for CFRA procedures in accordance with aspects of the present disclosure. The operations of the method 1500 may be implemented by a network entity or its components as described herein. For example, the operations of the method 1500 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware. The operations of the method 1500 may be performed by a CFRA procedure component 1125 as described with reference to FIG. 11.

At 1505, the method may include receiving, from a second network entity, a first uplink message via a first resource associated with a first resource index and via a first waveform type. The operations of 1505 may be performed in accordance with examples as disclosed herein. In some examples, aspects of the operations of 1505 may be performed by a first uplink message reception component 1130 as described with reference to FIG. 11.

At 1510, the method may include transmitting, to the second network entity and in response to the first uplink message, a random access response message. The operations of 1510 may be performed in accordance with examples as disclosed herein. In some examples, aspects of the operations of 1510 may be performed by a RAR message transmission component 1135 as described with reference to FIG. 11.

At 1515, the method may include receiving, from the second network entity and in response to the random access response message, a second uplink message via a second resource associated with the first resource index and via the first waveform type. The operations of 1515 may be performed in accordance with examples as disclosed herein. In some examples, aspects of the operations of 1515 may be performed by a second uplink message reception component 1140 as described with reference to FIG. 11.

Figure 16:
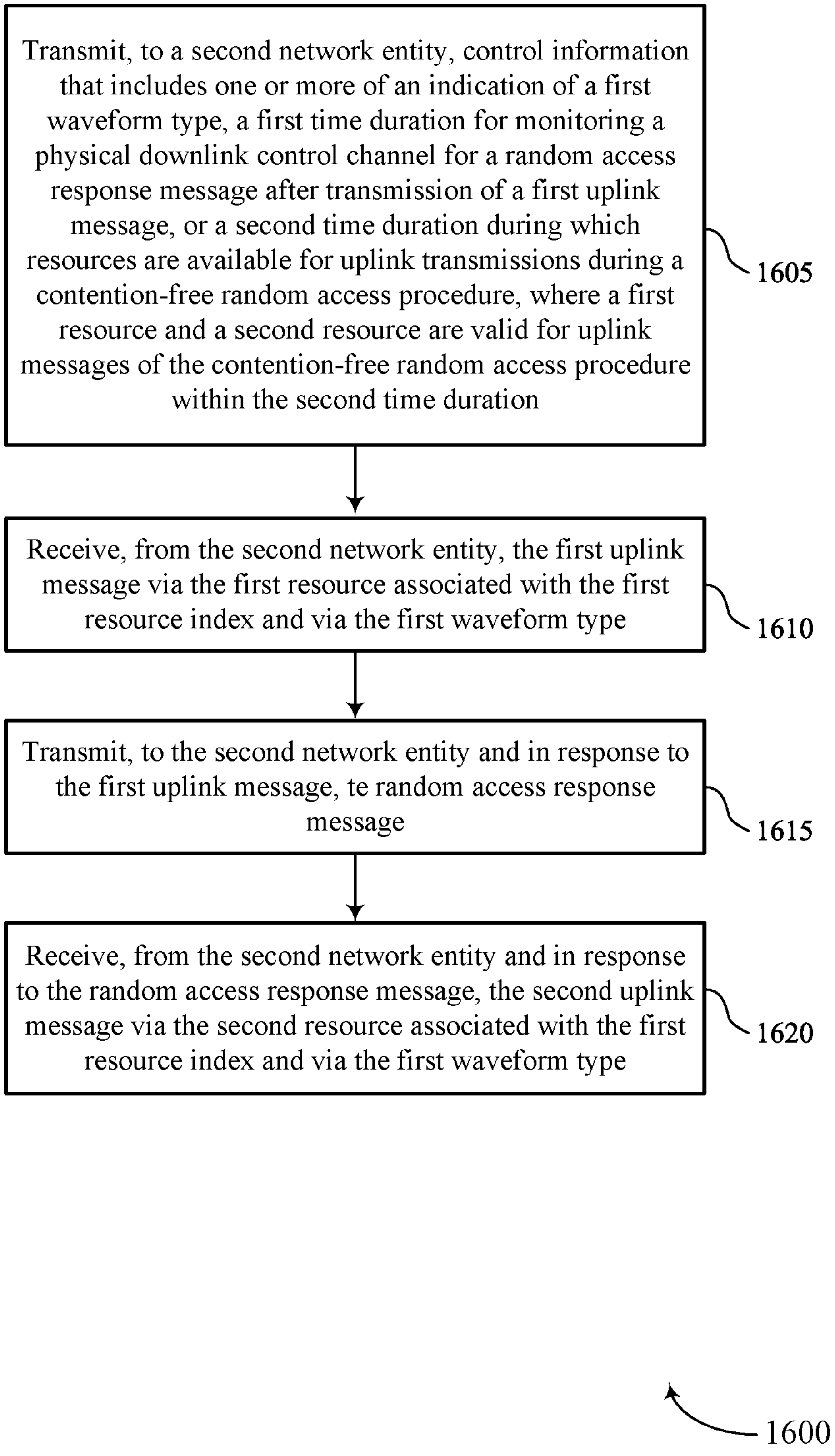

FIG. 16 shows a flowchart illustrating a method 1600 that supports reusing waveform types for CFRA procedures in accordance with aspects of the present disclosure. The operations of the method 1600 may be implemented by a network entity or its components as described herein. For example, the operations of the method 1600 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware. The operations of the method 1600 may be performed by a CFRA procedure component 1125 as described with reference to FIG. 11.

At 1605, the method may include transmitting, to a second network entity, control information that includes one or more of an indication of a first waveform type, a first time duration for monitoring a physical downlink control channel for a random access response message after transmission of a first uplink message, or a second time duration during which resources are available for uplink transmissions during a CFRA procedure, where a first resource and a second resource are valid for uplink messages of the CFRA procedure within the second time duration. The operations of 1605 may be performed in accordance with examples as disclosed herein. In some examples, aspects of the operations of 1605 may be performed by a control information transmission component 1150 as described with reference to FIG. 11.

At 1610, the method may include receiving, from the second network entity, the first uplink message via the first resource associated with a first resource index and via the first waveform type. The operations of 1610 may be performed in accordance with examples as disclosed herein. In some examples, aspects of the operations of 1610 may be performed by a first uplink message reception component 1130 as described with reference to FIG. 11.

At 1615, the method may include transmitting, to the second network entity and in response to the first uplink message, the random access response message. The operations of 1615 may be performed in accordance with examples as disclosed herein. In some examples, aspects of the operations of 1615 may be performed by a RAR message transmission component 1135 as described with reference to FIG. 11.

At 1620, the method may include receiving, from the second network entity and in response to the random access response message, a second uplink message via the second resource associated with the first resource index and via the first waveform type. The operations of 1620 may be performed in accordance with examples as disclosed herein. In some examples, aspects of the operations of 1620 may be performed by a second uplink message reception component 1140 as described with reference to FIG. 11.

Figure 17:
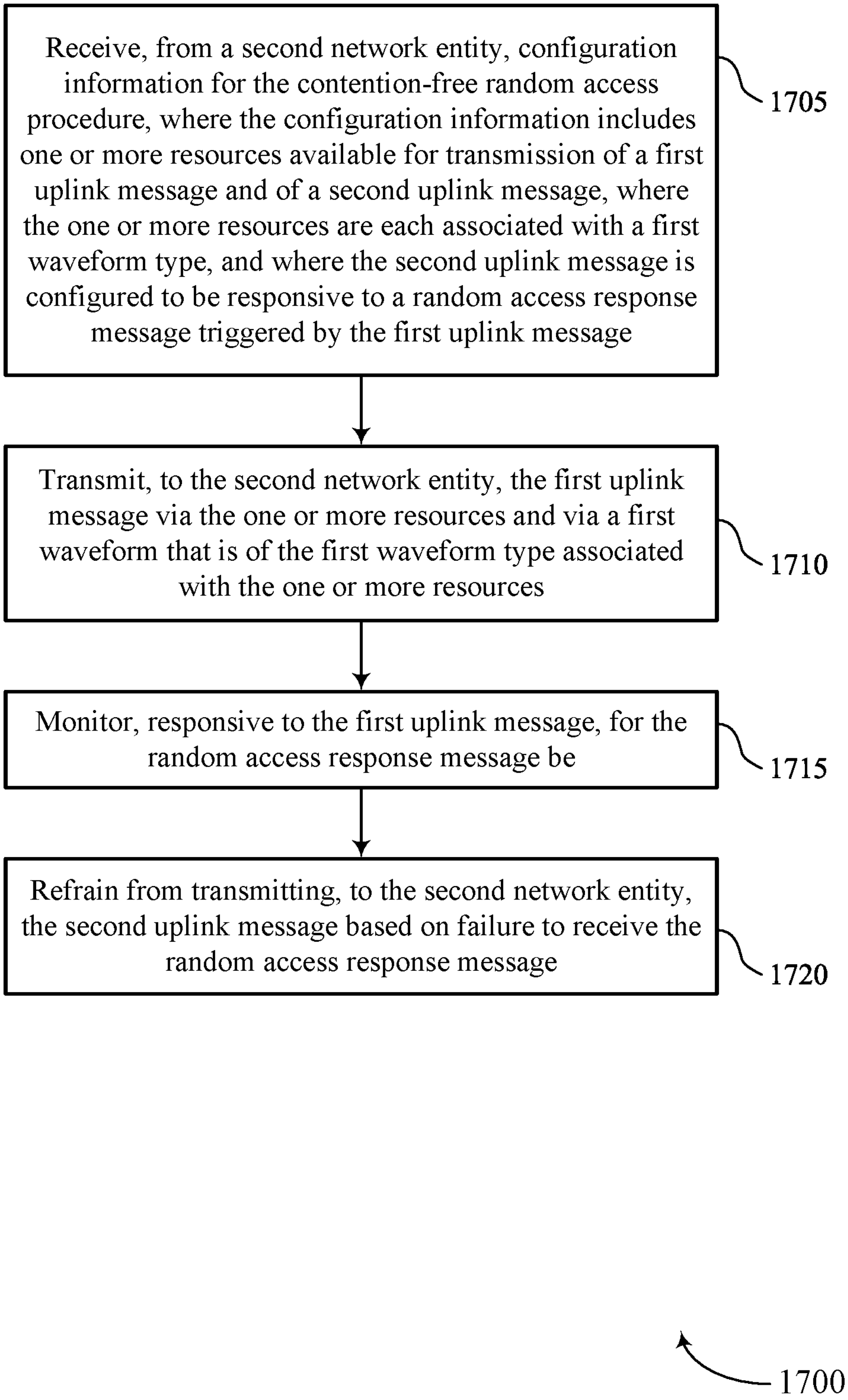

FIG. 17 shows a flowchart illustrating a method 1700 that supports reusing waveform types for CFRA procedures in accordance with aspects of the present disclosure. The operations of the method 1700 may be implemented by a UE or its components as described herein. For example, the operations of the method 1700 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware. The operations of the method 1700 may be performed by a CFRA procedure manager 725 as described with reference to FIG. 7.

At 1705, the method may include receiving, from a second network entity, configuration information for the CFRA procedure, where the configuration information includes one or more resources available for transmission of a first uplink message and of a second uplink message, where the one or more resources are each associated with a first waveform type, and where the second uplink message is configured to be responsive to a random access response message triggered by the first uplink message. The operations of 1705 may be performed in accordance with examples as disclosed herein. In some examples, aspects of the operations of 1705 may be performed by a configuration information reception manager 745 as described with reference to FIG. 7.

At 1710, the method may include transmitting, to the second network entity, the first uplink message via the one or more resources and via a first waveform that is of the first waveform type associated with the one or more resources. The operations of 1710 may be performed in accordance with examples as disclosed herein. In some examples, aspects of the operations of 1710 may be performed by a first uplink message transmission manager 730 as described with reference to FIG. 7.

At 1715, the method may include monitoring, responsive to the first uplink message, for the random access response message. The operations of 1715 may be performed in accordance with examples as disclosed herein. In some examples, aspects of the operations of 1715 may be performed by a random access response message reception manager 750 as described with reference to FIG. 7.

At 1720, the method may include refraining from transmitting, to the second network entity, the second uplink message based on failure to receive the random access response message. The operations of 1720 may be performed in accordance with examples as disclosed herein. In some examples, aspects of the operations of 1720 may be performed by a second uplink message transmission manager 740 as described with reference to FIG. 7.

Figure 18:
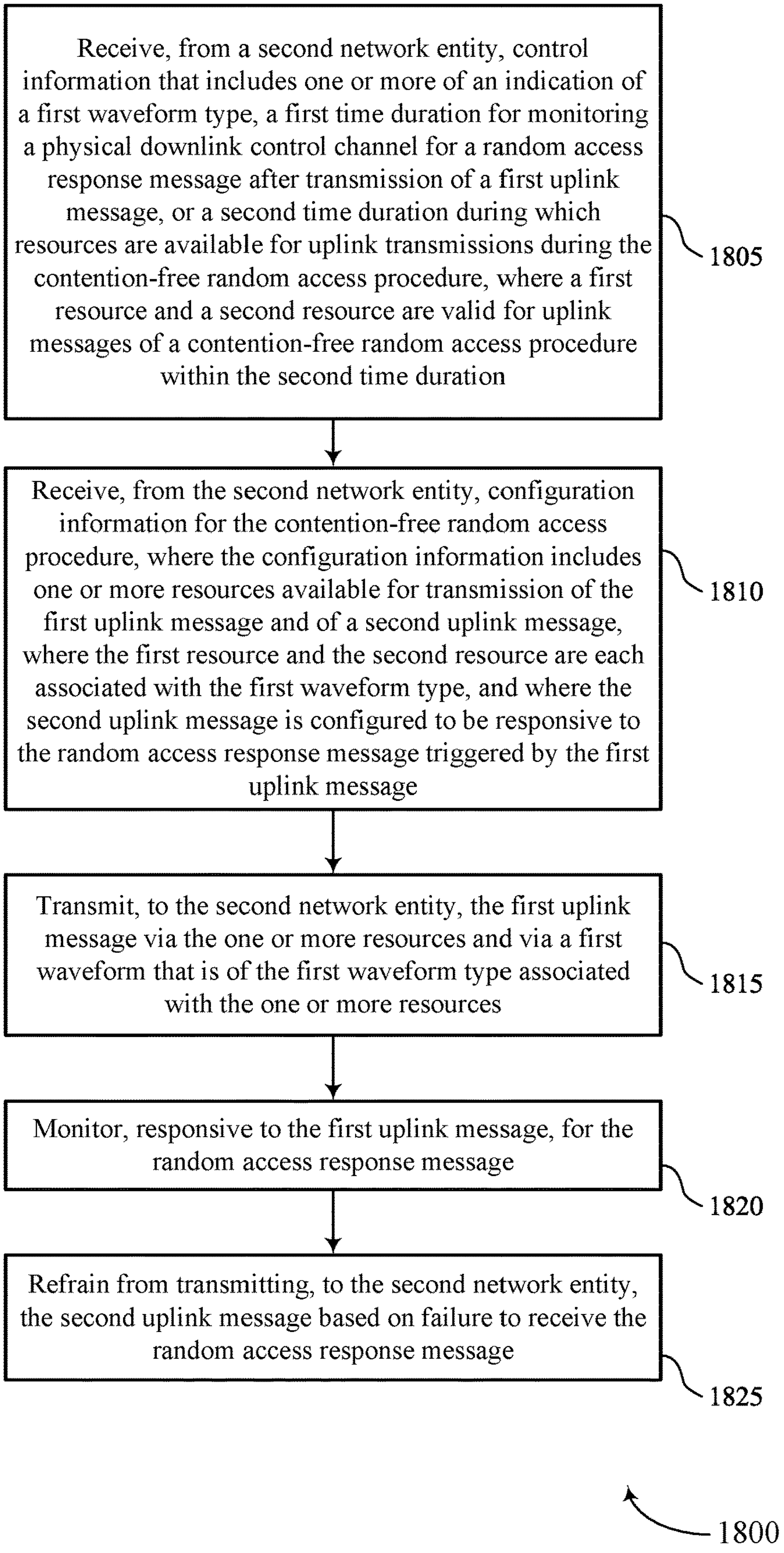

FIG. 18 shows a flowchart illustrating a method 1800 that supports reusing waveform types for CFRA procedures in accordance with aspects of the present disclosure. The operations of the method 1800 may be implemented by a UE or its components as described herein. For example, the operations of the method 1800 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware. The operations of the method 1800 may be performed by a CFRA procedure manager 725 as described with reference to FIG. 7.

At 1805, the method may include receiving, from a second network entity, control information that includes one or more of an indication of a first waveform type, a first time duration for monitoring a physical downlink control channel for a random access response message after transmission of a first uplink message, or a second time duration during which resources are available for uplink transmissions during a CFRA procedure, where a first resource and a second resource are valid for uplink messages of the CFRA procedure within the second time duration. The operations of 1805 may be performed in accordance with examples as disclosed herein. In some examples, aspects of the operations of 1805 may be performed by a control information reception manager 755 as described with reference to FIG. 7.

At 1810, the method may include receiving, from the second network entity, configuration information for the CFRA procedure, where the configuration information includes one or more resources available for transmission of the first uplink message and of a second uplink message, where the one or more resources are each associated with the first waveform type, and where the second uplink message is configured to be responsive to the random access response message triggered by the first uplink message. The operations of 1810 may be performed in accordance with examples as disclosed herein. In some examples, aspects of the operations of 1810 may be performed by a configuration information reception manager 745 as described with reference to FIG. 7.

At 1815, the method may include transmitting, to the second network entity, the first uplink message via the one or more resources and via a first waveform that is of the first waveform type associated with the one or more resources. The operations of 1815 may be performed in accordance with examples as disclosed herein. In some examples, aspects of the operations of 1815 may be performed by a first uplink message transmission manager 730 as described with reference to FIG. 7.

At 1820, the method may include monitoring, responsive to the first uplink message, for the random access response message. The operations of 1820 may be performed in accordance with examples as disclosed herein. In some examples, aspects of the operations of 1820 may be performed by a random access response message reception manager 750 as described with reference to FIG. 7.

At 1825, the method may include refraining from transmitting, to the second network entity, the second uplink message based on failure to receive the random access response message. The operations of 1825 may be performed in accordance with examples as disclosed herein. In some examples, aspects of the operations of 1825 may be performed by a second uplink message transmission manager 740 as described with reference to FIG. 7.

Figure 19:
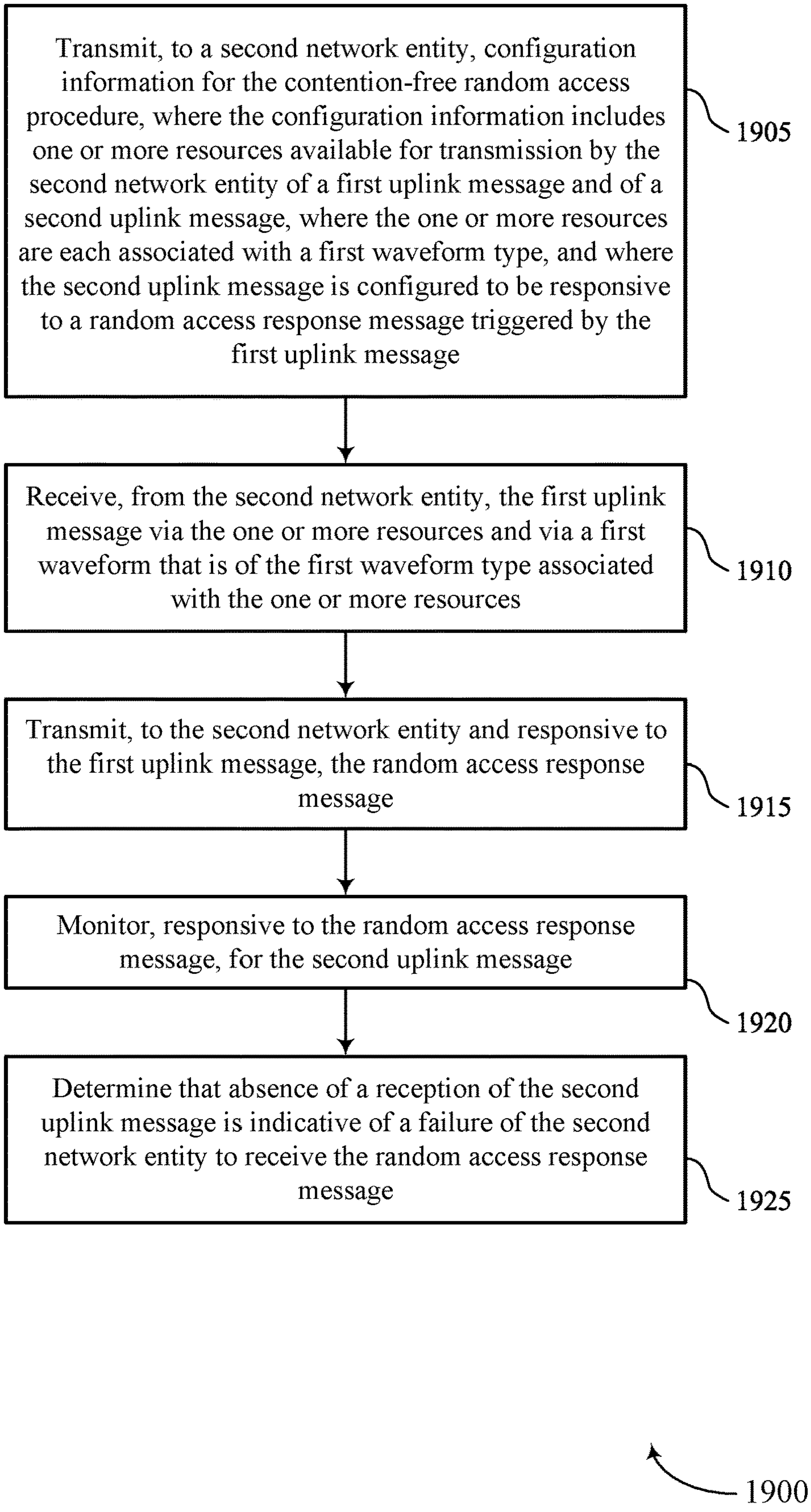

FIG. 19 shows a flowchart illustrating a method 1900 that supports reusing waveform types for CFRA procedures in accordance with aspects of the present disclosure. The operations of the method 1900 may be implemented by a network entity or its components as described herein. For example, the operations of the method 1900 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware. The operations of the method 1900 may be performed by a CFRA procedure component 1125 as described with reference to FIG. 11.

At 1905, the method may include transmitting, to a second network entity, configuration information for the CFRA procedure, where the configuration information includes one or more resources available for transmission by the second network entity of a first uplink message and of a second uplink message, where the one or more resources are each associated with a first waveform type, and where the second uplink message is configured to be responsive to a random access response message triggered by the first uplink message. The operations of 1905 may be performed in accordance with examples as disclosed herein. In some examples, aspects of the operations of 1905 may be performed by a configuration information transmission manager 1145 as described with reference to FIG. 11.

At 1910, the method may include receiving, from the second network entity, the first uplink message via the one or more resources and via a first waveform that is of the first waveform type associated with the one or more resources. The operations of 1910 may be performed in accordance with examples as disclosed herein. In some examples, aspects of the operations of 1910 may be performed by a first uplink message reception component 1130 as described with reference to FIG. 11.

At 1915, the method may include transmitting, to the second network entity and responsive to the first uplink message, the random access response message. The operations of 1915 may be performed in accordance with examples as disclosed herein. In some examples, aspects of the operations of 1915 may be performed by a RAR message transmission component 1135 as described with reference to FIG. 11.

At 1920, the method may include monitoring, responsive to the random access response message, for the second uplink message. The operations of 1920 may be performed in accordance with examples as disclosed herein. In some examples, aspects of the operations of 1920 may be performed by a second uplink message reception component 1140 as described with reference to FIG. 11.

At 1925, the method may include determining that absence of a reception of the second uplink message is indicative of a failure of the second network entity to receive the random access response message. The operations of 1925 may be performed in accordance with examples as disclosed herein. In some examples, aspects of the operations of 1925 may be performed by a second uplink message reception component 1140 as described with reference to FIG. 11.

Figure 20:
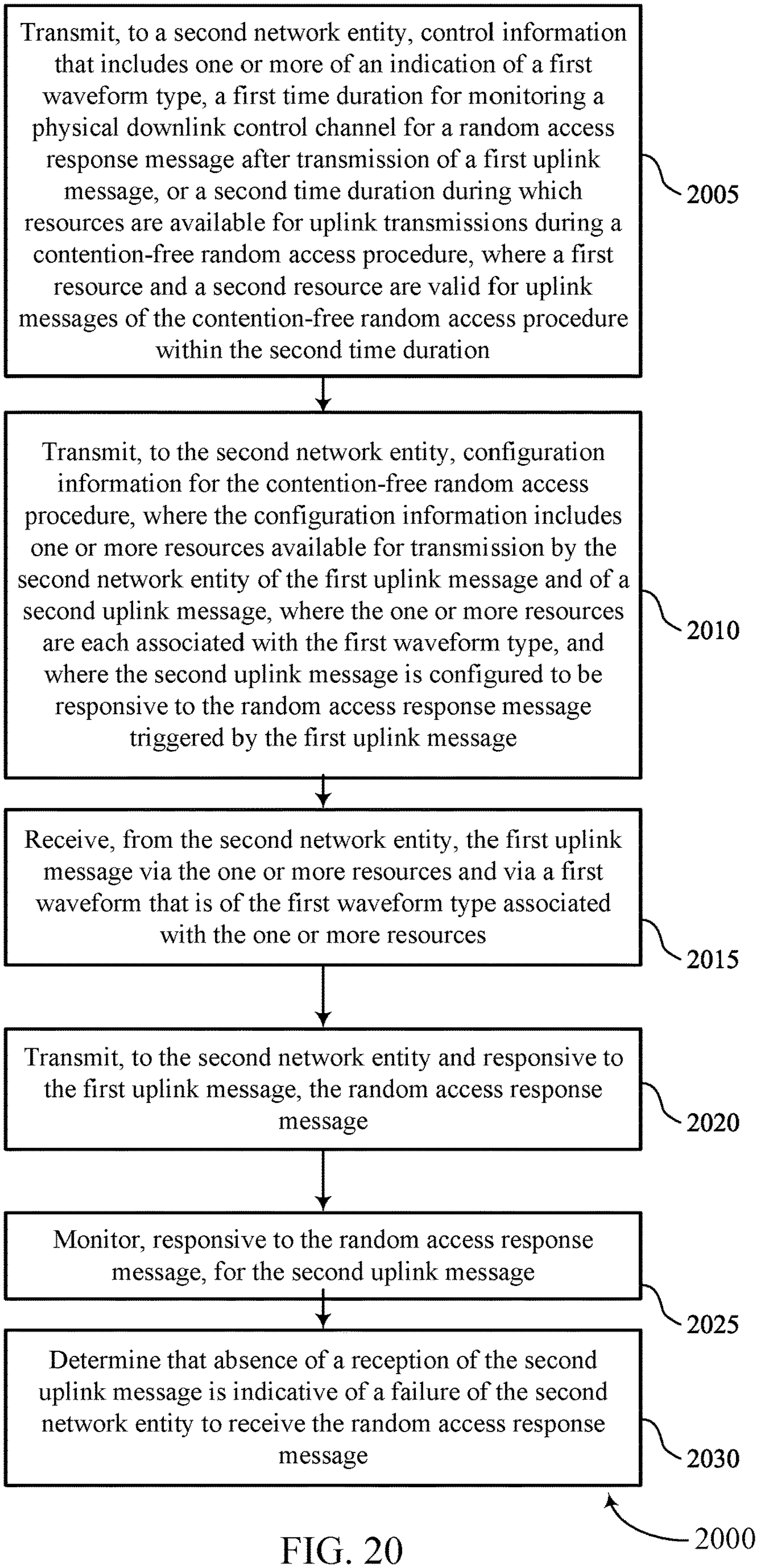

FIG. 20 shows a flowchart illustrating a method 2000 that supports reusing waveform types for CFRA procedures in accordance with aspects of the present disclosure. The operations of the method 2000 may be implemented by a network entity or its components as described herein. For example, the operations of the method 2000 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware. The operations of the method 2000 may be performed by a CFRA procedure component 1125 as described with reference to FIG. 11.

At 2005, the method may include transmitting, to a second network entity, control information that includes one or more of an indication of a first waveform type, a first time duration for monitoring a physical downlink control channel for a random access response message after transmission of a first uplink message, or a second time duration during which resources are available for uplink transmissions during a CFRA procedure, where a first resource and a second resource are valid for uplink messages of the CFRA procedure within the second time duration. The operations of 2005 may be performed in accordance with examples as disclosed herein. In some examples, aspects of the operations of 2005 may be performed by a control information transmission component 1150 as described with reference to FIG. 11.

At 2010, the method may include transmitting, to the second network entity, configuration information for the CFRA procedure, where the configuration information includes one or more resources available for transmission by the second network entity of the first uplink message and of a second uplink message, where the one or more resources are each associated with the first waveform type, and where the second uplink message is configured to be responsive to the random access response message triggered by the first uplink message. The operations of 2010 may be performed in accordance with examples as disclosed herein. In some examples, aspects of the operations of 2010 may be performed by a configuration information transmission manager 1145 as described with reference to FIG. 11.

At 2015, the method may include receiving, from the second network entity, the first uplink message via the one or more resources and via a first waveform that is of the first waveform type associated with the one or more resources. The operations of 2015 may be performed in accordance with examples as disclosed herein. In some examples, aspects of the operations of 2015 may be performed by a first uplink message reception component 1130 as described with reference to FIG. 11.

At 2020, the method may include transmitting, to the second network entity and responsive to the first uplink message, the random access response message. The operations of 2020 may be performed in accordance with examples as disclosed herein. In some examples, aspects of the operations of 2020 may be performed by a RAR message transmission component 1135 as described with reference to FIG. 11.

At 2025, the method may include monitoring, responsive to the random access response message, for the second uplink message. The operations of 2025 may be performed in accordance with examples as disclosed herein. In some examples, aspects of the operations of 2025 may be performed by a second uplink message reception component 1140 as described with reference to FIG. 11.

At 2030, the method may include determining that absence of a reception of the second uplink message is indicative of a failure of the second network entity to receive the random access response message. The operations of 2030 may be performed in accordance with examples as disclosed herein. In some examples, aspects of the operations of 2030 may be performed by a second uplink message reception component 1140 as described with reference to FIG. 11.

The following provides an overview of aspects of the present disclosure:

Aspect 1: A method for wireless communication by a first network entity, comprising: performing a CFRA procedure, wherein preforming the CFRA procedure comprises: transmitting, to a second network entity, a first uplink message via a first resource associated with a first resource index and via a first waveform type; receiving, from the second network entity and in response to the first uplink message, a RAR message; and transmitting, to the second network entity and in response to the RAR message, a second uplink message via a second resource associated with the first resource index and via the first waveform type.

Aspect 2: The method of aspect 1, wherein performing the CFRA procedure further comprises: receiving, from the second network entity, control information that includes one or more of an indication of the first waveform type, a first time duration for monitoring a PDCCH for the RAR message after transmission of the first uplink message, or a second time duration during which resources are available for uplink transmissions during the CFRA procedure, wherein the first resource and the second resource are valid for uplink messages of the CFRA procedure within the second time duration.

Aspect 3: The method of aspect 2, wherein the first time duration overlaps with the second time duration, and the second time duration extends later in time than the first time duration.

Aspect 4: The method of any of aspects 1 through 3, wherein the first resource and the second resource comprise PRACH occasions and the first waveform type comprises a CFRA preamble.

Aspect 5: The method of any of aspects 1 through 3, wherein the first resource and the second resource comprise PUCCH occasions and the first waveform type comprises a PUCCH waveform.

Aspect 6: The method of aspect 5, wherein a cyclic prefix associated with the PUCCH waveform is longer than a RTT associated with communication between the first network entity and the second network entity.

Aspect 7: The method of any of aspects 5 through 6, wherein a transmit beam used for transmission of the first uplink message and the second uplink message is associated with a downlink reference signal beam, and wherein performing the CFRA procedure further comprises: receiving, from the second network entity, a control message that includes an indication of the association between the transmit beam and the downlink reference signal beam.

Aspect 8: The method of any of aspects 1 through 7, wherein the RAR message includes an indication of a TAC for application to subsequent uplink communications from the first network entity to the second network entity, and transmission of the second uplink message is based at least in part on the TAC.

Aspect 9: The method of any of aspects 1 through 8, wherein transmission of the first uplink message is based at least in part on a default TAC, and wherein the default TAC is zero.

Aspect 10: The method of any of aspects 1 through 9, wherein the RAR message is a compact RAR message that is received via a PDCCH, and the compact RAR message does not comprise resource allocation information associated with one or more physical downlink data channels.

Aspect 11: A method for wireless communication by a first network entity, comprising: performing a CFRA procedure, wherein performing the CFRA procedure comprises: receiving, from a second network entity, a first uplink message via a first resource associated with a first resource index and via a first waveform type; transmitting, to the second network entity and in response to the first uplink message, a RAR message; and receiving, from the second network entity and in response to the RAR message, a second uplink message via a second resource associated with the first resource index and via the first waveform type.

Aspect 12: The method of aspect 11, wherein performing the CFRA procedure comprises: transmitting, to the second network entity, control information that includes one or more of an indication of the first waveform type, a first time duration for monitoring a PDCCH for the RAR message after transmission of the first uplink message, or a second time duration during which resources are available for uplink transmissions during the CFRA procedure, wherein the first resource and the second resource are valid for uplink messages of the CFRA procedure within the second time duration.

Aspect 13: The method of aspect 12, wherein the first time duration overlaps with the second time duration, and the second time duration extends later in time than the first time duration.

Aspect 14: The method of any of aspects 11 through 13, wherein the first resource and the second resource comprise PUCCH occasions and the first waveform type comprises a PUCCH waveform.

Aspect 15: The method of aspect 14, wherein a cyclic prefix associated with the PUCCH waveform is longer than a RTT associated with communication between the first network entity and the second network entity.

Aspect 16: The method of any of aspects 14 through 15, wherein a transmit beam used for transmission of the first uplink message and the second uplink message is associated with a downlink reference signal beam, and wherein performing the CFRA procedure comprises: transmitting, to the second network entity, a control message that includes an indication of the association between the transmit beam and the downlink reference signal beam.

Aspect 17: The method of any of aspects 11 through 16, wherein the RAR message includes an indication of a TAC for application to communications from the second network entity to the first network entity.

Aspect 18: The method of any of aspects 11 through 17, wherein the RAR message is a compact RAR message that is received via a PDCCH, and the compact RAR message does not comprise resource allocation information associated with one or more physical downlink data channels.

Aspect 19: A method for wireless communication by a first network entity, comprising: performing a CFRA procedure, wherein performing CFRA procedure comprises: receiving, from a second network entity, configuration information for the CFRA procedure, wherein the configuration information comprises one or more resources available for transmission of a first uplink message and of a second uplink message, wherein the one or more resources are each associated with a first waveform type, and wherein the second uplink message is configured to be responsive to a RAR message triggered by the first uplink message; transmitting, to the second network entity, the first uplink message via the one or more resources and via a first waveform that is of the first waveform type associated with the one or more resources; monitoring, responsive to the first uplink message, for the RAR message be; and refraining from transmitting, to the second network entity, the second uplink message based on failure to receive the RAR message.

Aspect 20: The method of aspect 19, wherein non-transmission of the second uplink message is indicative of the failure of the first network entity to receive the RAR message.

Aspect 21: The method of any of aspects 19 through 20, wherein performing the CFRA procedure further comprises: receiving, from the second network entity, control information that includes one or more of an indication of the first waveform type, a first time duration for monitoring a PDCCH for the RAR message after transmission of the first uplink message, or a second time duration during which resources are available for uplink transmissions during the CFRA procedure, wherein the first resource and the second resource are valid for uplink messages of the CFRA procedure within the second time duration.

Aspect 22: The method of aspect 21, wherein the first time duration overlaps with the second time duration, and the second time duration extends later in time than the first time duration.

Aspect 23: The method of any of aspects 19 through 22, wherein the one or more resources comprise PRACH occasions and the first waveform type comprises a CFRA preamble.

Aspect 24: The method of any of aspects 19 through 22, wherein the one or more resources comprise PUCCH occasions and the first waveform type comprises a PUCCH waveform.

Aspect 25: The method of any of aspects 19 through 24, wherein the RAR message includes an indication of a TAC for application to communications from the first network entity to the second network entity.

Aspect 26: The method of any of aspects 19 through 25, wherein the RAR message is a compact RAR message that is received via a PDCCH, and the compact RAR message does not comprise resource allocation information associated with one or more physical downlink data channels.

Aspect 27: A method for wireless communications by a first network entity, comprising: performing a CFRA procedure, wherein performing the CFRA procedure comprises: transmitting, to a second network entity, configuration information for the CFRA procedure, wherein the configuration information comprises one or more resources available for transmission by the second network entity of a first uplink message and of a second uplink message, wherein the one or more resources are each associated with a first waveform type, and wherein the second uplink message is configured to be responsive to a RAR message triggered by the first uplink message; receiving, from the second network entity, the first uplink message via the one or more resources and via a first waveform that is of the first waveform type associated with the one or more resources; transmitting, to the second network entity and responsive to the first uplink message, the RAR message; monitoring, responsive to the RAR message, for the second uplink message; and determining that absence of a reception of the second uplink message is indicative of a failure of the second network entity to receive the RAR message.

Aspect 28: The method of aspect 27, wherein performing the CFRA procedure further comprises: transmitting, to the second network entity, control information that includes one or more of an indication of the first waveform type, a first time duration for monitoring a PDCCH for the RAR message after transmission of the first uplink message, or a second time duration during which resources are available for uplink transmissions during the CFRA procedure, wherein the first resource and the second resource are valid for uplink messages of the CFRA procedure within the second time duration.

Aspect 29: The method of aspect 28, wherein the first time duration overlaps with the second time duration, and the second time duration extends later in time than the first time duration.

Aspect 30: The method of any of aspects 27 through 29, wherein the one or more resources comprise PRACH occasions and the first waveform type comprises a CFRA preamble.

Aspect 31: The method of any of aspects 27 through 29, wherein the one or more resources comprise PUCCH occasions and the first waveform type comprises a PUCCH waveform.

Aspect 32: The method of any of aspects 27 through 31, wherein the RAR message includes an indication of a TAC for application to communications from the second network entity to the first network entity.

Aspect 33: The method of any of aspects 27 through 32, wherein a default TAC for the first uplink message is zero.

Aspect 34: The method of any of aspects 27 through 33, wherein the RAR message is a compact RAR message that is received via a PDCCH, and the compact RAR message does not comprise resource allocation information associated with one or more physical downlink data channels.

Aspect 35: A first network entity for wireless communication, comprising one or more memories storing processor-executable code, and one or more processors coupled with the one or more memories and individually or collectively operable to execute the code to cause the first network entity to perform a method of any of aspects 1 through 10.

Aspect 36: A first network entity for wireless communication, comprising at least one means for performing a method of any of aspects 1 through 10.

Aspect 37: A non-transitory computer-readable medium having code for wireless communication stored thereon that, when executed by a network node, causes the network node to perform a method of any of aspects 1 through 10.

Aspect 38: A first network entity for wireless communication, comprising one or more memories storing processor-executable code, and one or more processors coupled with the one or more memories and individually or collectively operable to execute the code to cause the first network entity to perform a method of any of aspects 11 through 18.

Aspect 39: A first network entity for wireless communication, comprising at least one means for performing a method of any of aspects 11 through 18.

Aspect 40: A non-transitory computer-readable medium having code for wireless communication stored thereon that, when executed by a network node, causes the network node to perform a method of any of aspects 11 through 18.

Aspect 41: A first network entity for wireless communication, comprising one or more memories storing processor-executable code, and one or more processors coupled with the one or more memories and individually or collectively operable to execute the code to cause the first network entity to perform a method of any of aspects 19 through 26.

Aspect 42: A first network entity for wireless communication, comprising at least one means for performing a method of any of aspects 19 through 26.

Aspect 43: A non-transitory computer-readable medium having code for wireless communication stored thereon that, when executed by a network node, causes the network node to perform a method of any of aspects 19 through 26.

Aspect 44: A first network entity for wireless communications, comprising one or more memories storing processor-executable code, and one or more processors coupled with the one or more memories and individually or collectively operable to execute the code to cause the first network entity to perform a method of any of aspects 27 through 34.

Aspect 45: A first network entity for wireless communications, comprising at least one means for performing a method of any of aspects 27 through 34.

Aspect 46: A non-transitory computer-readable medium storing code for wireless communications, the code comprising instructions executable by a processor to perform a method of any of aspects 27 through 34.

The methods described herein describe possible implementations, and the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

As used herein, the term "or" is an inclusive "or" unless limiting language is used relative to the alternatives listed. For example, reference to "X being based on A or B" shall be construed as including within its scope X being based on A, X being based on B, and X being based on A and B. In this regard, reference to "X being based on A or B" refers to "at least one of A or B" or "one or more of A or B" due to "or" being inclusive. Similarly, reference to "X being based on A, B, or C" shall be construed as including within its scope X being based on A, X being based on B, X being based on C, X being based on A and B, X being based on A and C, X being based on B and C, and X being based on A, B, and C. In this regard, reference to "X being based on A, B, or C" refers to "at least one of A, B, or C" or "one or more of A, B, or C" due to "or" being inclusive. As an example of limiting language, reference to "X being based on only one of A or B" shall be construed as including within its scope X being based on A as well as X being based on B, but not X being based on A and B. Also, as used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently. Also, as used herein, the phrase "a set" shall be construed as including the possibility of a set with one member. That is, the phrase "a set" shall be construed in the same manner as "one or more" or "at least one of."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the drawings, describes example configurations and does not represent all the examples that may be implemented or that are within the scope of the claims. The term "aspect" or "example" used herein means "serving as an aspect, example, instance, or illustration," and not "preferred" or "advantageous over other aspects." The detailed description includes specific details for the purpose of providing an understanding of the described techniques. These techniques, however, may be practiced without these specific details. In some instances, structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A first network entity for wireless communication, comprising:
- a processing system configured to:
  - perform a contention-free random access procedure, wherein, to perform the contention-free random access procedure, the processing system is configured to:
  - transmit, to a second network entity, a first uplink message via a first resource associated with a first resource index and via a first waveform of a first waveform type;
  - receive, from the second network entity and in response to the first uplink message, a random access response message; and
  - transmit, to the second network entity and in response to the random access response message, a second uplink message via a second resource associated with the same first resource index as the first resource and via a second waveform of the same first waveform type as the first waveform.

2. The first network entity of claim 1, wherein, to perform the contention-free random access procedure, the processing system is configured to:
- receive, from the second network entity, control information that includes one or more of:
  - an indication of the first waveform type;
  - a first time duration for monitoring a physical downlink control channel for the random access response message after transmission of the first uplink message; or
  - a second time duration during which resources are available for uplink transmissions during the contention-free random access procedure, wherein the first resource and the second resource are valid for uplink messages of the contention-free random access procedure within the second time duration.

3. The first network entity of claim 2, wherein the first time duration overlaps with the second time duration, and wherein the second time duration extends later in time than the first time duration.

4. The first network entity of claim 1, wherein the first resource and the second resource comprise physical random access channel occasions and wherein the first waveform type comprises a contention-free random access preamble.

5. The first network entity of claim 1, wherein the first resource and the second resource comprise physical uplink control channel occasions and wherein the first waveform type comprises a physical uplink control channel waveform.

6. The first network entity of claim 5, wherein a cyclic prefix associated with the physical uplink control channel waveform is longer than a round trip time associated with communication between the first network entity and the second network entity.

7. The first network entity of claim 5, wherein a transmit beam used for transmission of the first uplink message and the second uplink message is associated with a downlink reference signal beam, and wherein, to perform the contention-free random access procedure, the processing system is configured to:

receive, from the second network entity, a control message that includes an indication of the association between the transmit beam and the downlink reference signal beam.

8. The first network entity of claim 1, wherein the random access response message includes an indication of a timing advance command for application to subsequent uplink communications from the first network entity to the second network entity, and wherein transmission of the second uplink message is based at least in part on the timing advance command.

9. The first network entity of claim 1, wherein transmission of the first uplink message is based at least in part on a default timing advance command, the default timing advance command is zero.

10. The first network entity of claim 1, wherein the random access response message is a compact random access response message that is received via a physical downlink control channel, and wherein the compact random access response message does not comprise resource allocation information associated with one or more physical downlink data channels.

11. A first network entity for wireless communication, comprising:

a processing system configured to:

perform a contention-free random access procedure, wherein, to perform the contention-free random access procedure, the processing system is configured to:

receive, from a second network entity, a first uplink message via a first resource associated with a first resource index and via a first waveform of a first waveform type;

transmit, to the second network entity and in response to the first uplink message, a random access response message; and receive, from the second network entity and in response to the random access response message, a second uplink message via a second resource associated with the same first resource index as the first resource and via a second waveform of the same first waveform type as the first waveform.

12. The first network entity of claim 11, wherein, to perform the contention-free random access procedure, the processing system is configured to:

transmit, to the second network entity, control information that includes one or more of:

an indication of the first waveform type;

a first time duration for monitoring a physical downlink control channel for the random access response message after transmission of the first uplink message; or a second time duration during which resources are available for uplink transmissions during the contention-free random access procedure, wherein the first resource and the second resource are valid for uplink messages of the contention-free random access procedure within the second time duration.

13. The first network entity of claim 12, wherein the first time duration overlaps with the second time duration, and wherein the second time duration extends later in time than the first time duration.

14. The first network entity of claim 11, wherein the first resource and the second resource comprise physical random access channel occasions and wherein the first waveform type comprises a contention-free random access preamble.

15. The first network entity of claim 11, wherein the first resource and the second resource comprise physical uplink control channel occasions and wherein the first waveform type comprises a physical uplink control channel waveform.

16. The first network entity of claim 15, wherein a cyclic prefix associated with the physical uplink control channel waveform is longer than a round trip time associated with communication between the first network entity and the second network entity.

17. The first network entity of claim 15, wherein a transmit beam used for transmission of the first uplink message and the second uplink message is associated with a downlink reference signal beam, and wherein, to perform the contention-free random access procedure, the processing system is configured to:

transmit, to the second network entity, a control message that includes an indication of the association between the transmit beam and the downlink reference signal beam.

18. The first network entity of claim 11, wherein the random access response message includes an indication of a timing advance command for application to communications from the second network entity to the first network entity.

19. The first network entity of claim 11, wherein a default timing advance command for the first uplink message is zero.

20. The first network entity of claim 11, wherein the random access response message is a compact random access response message that is received via a physical downlink control channel, and wherein the compact random access response message does not comprise resource allocation information associated with one or more physical downlink data channels.

21. A method of wireless communication performed by a first network entity, the method comprising:

performing a contention-free random access procedure, wherein performing the contention-free random access procedure comprises:

transmitting, to a second network entity, a first uplink message via a first resource associated with a first resource index and via a first waveform of a first waveform type;

receiving, from the second network entity and in response to the first uplink message, a random access response message; and transmitting, to the second network entity and in response to the random access response message, a second uplink message via a second resource associated with same first resource index as the first resource and via a second waveform of the same first waveform type as the first waveform.

22. The method of claim 21, wherein performing the contention-free random access procedure comprises:

receiving, from the second network entity, control information that includes one or more of:

an indication of the first waveform type;

a first time duration for monitoring a physical downlink control channel for the random access response message after transmission of the first uplink message; or a second time duration during which resources are available for uplink transmissions during the contention-free random access procedure, wherein the first resource and the second resource are valid for uplink messages of the contention-free random access procedure within the second time duration.

23. The method of claim 22, wherein the first time duration overlaps with the second time duration, and wherein the second time duration extends later in time than the first time duration.

24. The method of claim 21, wherein the first resource and the second resource comprise physical random access channel occasions and wherein the first waveform type comprises a contention-free random access preamble.

25. The method of claim 21, wherein the first resource and the second resource comprise physical uplink control channel occasions and wherein the first waveform type comprises a physical uplink control channel waveform.

26. The method of claim 25, wherein a cyclic prefix associated with the physical uplink control channel waveform is longer than a round trip time associated with communication between the first network entity and the second network entity.

27. The method of claim 25, wherein a transmit beam used for transmission of the first uplink message and the second uplink message is associated with a downlink reference signal beam, and wherein performing the contention-free random access procedure further comprises:

receiving, from the second network entity, a control message that includes an indication of the association between the transmit beam and the downlink reference signal beam.

28. The method of claim 21, wherein the random access response message includes an indication of a timing advance command for application to subsequent uplink communications from the first network entity to the second network entity, and wherein transmission of the second uplink message is based at least in part on the timing advance command.

29. The method of claim 21, wherein transmission of the first uplink message is based at least in part on a default timing advance command, the default timing advance command is zero.

30. The method of claim 21, wherein the random access response message is a compact random access response message that is received via a physical downlink control channel, and wherein the compact random access response message does not comprise resource allocation information associated with one or more physical downlink data channels.

31. A non-transitory computer-readable medium having code for wireless communication stored thereon that, when executed by a first network entity, causes the first network entity to:

perform a contention-free random access procedure, wherein, to perform the contention-free random access procedure, the instructions are further executable by the processor to:

transmit, to a second network entity, a first uplink message via a first resource associated with a first resource index and via a first waveform of a first waveform type;

receive, from the second network entity and in response to the first uplink message, a random access response message; and transmit, to the second network entity and in response to the random access response message, a second uplink message via a second resource associated with same first resource index as the first resource and via a second waveform of the same first waveform type as the first waveform.

32. The non-transitory computer-readable medium of claim 31, wherein, to perform the contention-free random access procedure, the code, when executed by the first network entity, causes the first network entity to:

receive, from the second network entity, control information that includes one or more of:

an indication of the first waveform type;

a first time duration for monitoring a physical downlink control channel for the random access response message after transmission of the first uplink message; or a second time duration during which resources are available for uplink transmissions during the contention-free random access procedure, wherein the first resource and the second resource are valid for uplink messages of the contention-free random access procedure within the second time duration.

33. The non-transitory computer-readable medium of claim 32, wherein the first time duration overlaps with the second time duration, and wherein the second time duration extends later in time than the first time duration.

34. The non-transitory computer-readable medium of claim 31, wherein the first resource and the second resource comprise physical random access channel occasions and wherein the first waveform type comprises a contention-free random access preamble.

35. The non-transitory computer-readable medium of claim 31, wherein the first resource and the second resource comprise physical uplink control channel occasions and wherein the first waveform type comprises a physical uplink control channel waveform.

36. The non-transitory computer-readable medium of claim 35, wherein a cyclic prefix associated with the physical uplink control channel waveform is longer than a round trip time associated with communication between the first network entity and the second network entity.

37. The non-transitory computer-readable medium of claim 35, wherein a transmit beam used for transmission of the first uplink message and the second uplink message is associated with a downlink reference signal beam, and wherein the code, when executed by the first network entity, causes the first network entity to:

receive, from the second network entity, a control message that includes an indication of the association between the transmit beam and the downlink reference signal beam.

* * * * *